(12) United States Patent
Lim et al.

(10) Patent No.: US 9,350,009 B1
(45) Date of Patent: May 24, 2016

(54) MULTILAYER ELECTRODE CONNECTOR DESIGNS AND APPLICATIONS THEREOF

(71) Applicant: Amazon Technologies, Inc., Seattle, WA (US)

(72) Inventors: James (Jimmy) Robert Lim, San Jose, CA (US); Yuting (Tim) Yeh, Sunnyvale, CA (US); Adrian Roy Ramiscal Santos, San Jose, CA (US); Christopher Thomas Li, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 14/498,756

(22) Filed: Sep. 26, 2014

(51) Int. Cl.
   *H01M 2/24* (2006.01)
   *H01M 10/42* (2006.01)
(52) U.S. Cl.
   CPC ............ *H01M 2/24* (2013.01); *H01M 10/4257* (2013.01); *H01M 2220/30* (2013.01)
(58) Field of Classification Search
   CPC .......................... H01M 2/24; H01M 10/4257
   See application file for complete search history.

(56) References Cited

U.S. PATENT DOCUMENTS

2005/0031945 A1* 2/2005 Morita ................. H01M 2/202
                                                         429/158
2007/0254211 A1* 11/2007 Kambe .................. H01M 2/24
                                                         429/160

\* cited by examiner

*Primary Examiner* — Helen O Conley
(74) *Attorney, Agent, or Firm* — Lee & Hayes, PLLC

(57) ABSTRACT

In an implementation, a battery package includes alternating electrodes. Each electrode includes a recessed region of electrode material layers that expose a conductive layer. Each electrode also includes openings within the electrode material layers and the conductive layer, where the openings are adjacent to the recessed regions. Multilayer electro-mechanical connectors couple exposed portions of the conductive layers of alternating electrodes to thereby electrically couple electrodes that have the same polarity. Each electrode is separated from an adjacent electrode by a separator layer. The multilayer electro-mechanical connectors can pierce the separator layers and thus, the separator layers do not require additional processing.

20 Claims, 16 Drawing Sheets

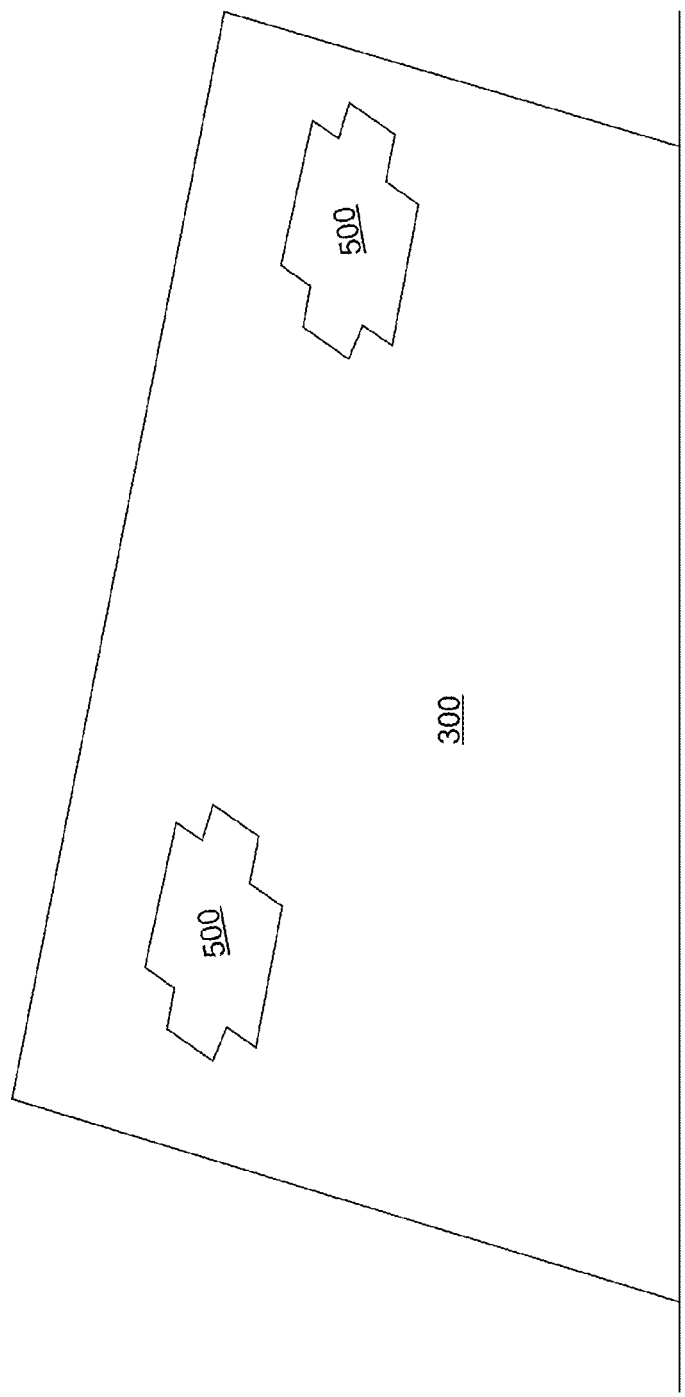

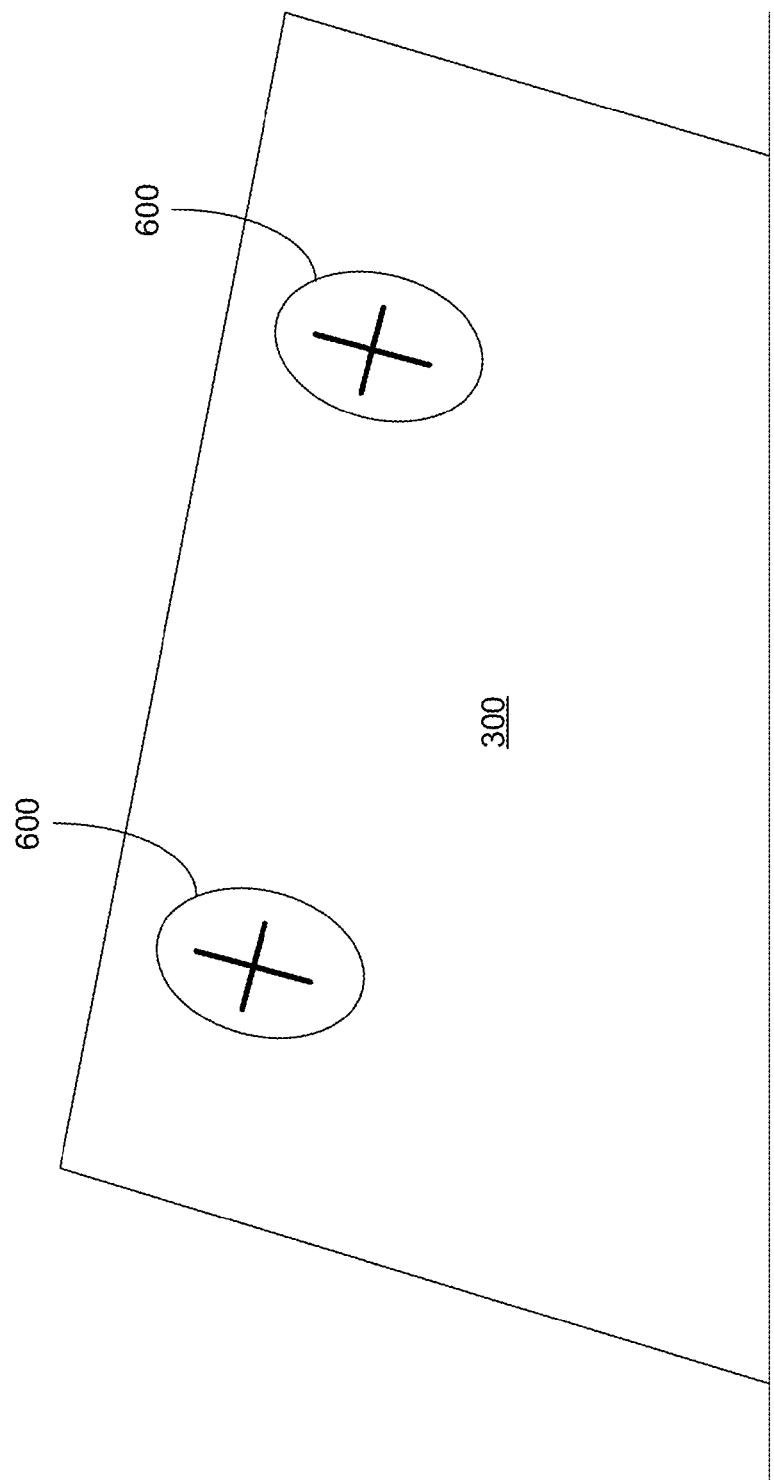

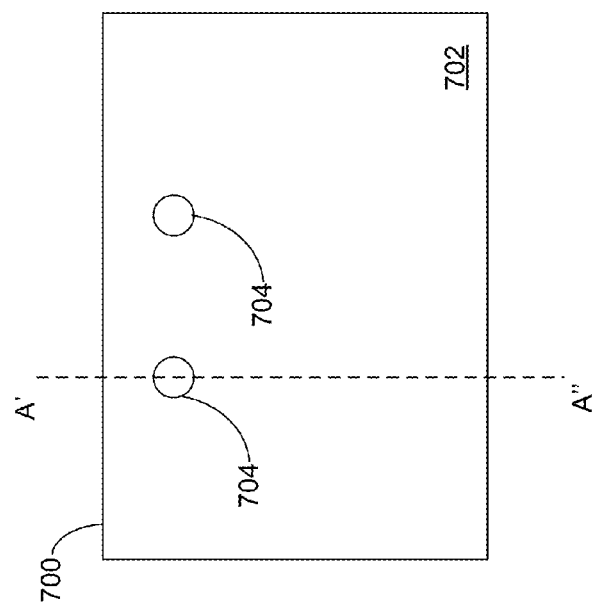
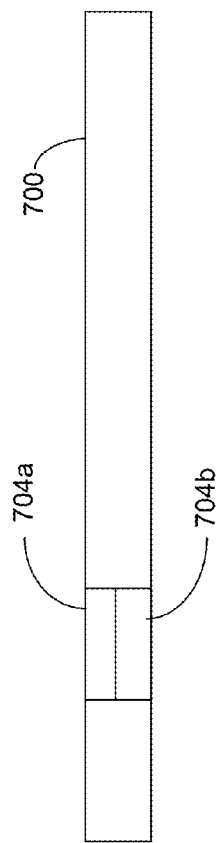
FIG. 7A
FIG. 7B

MULTILAYER ELECTRODE CONNECTOR DESIGNS AND APPLICATIONS THEREOF

BACKGROUND

Batteries are often used to power electronic devices, such as mobile phones, tablet computers, laptop computers, wearable electronic devices (e.g., watches, glasses), portable media players, portable gaming devices, robotic devices, and so forth. As electronic devices become smaller and lighter, batteries used to power the electronic devices are also reduced in size. For example, batteries have become thinner and have smaller surface areas to accommodate the reduction in size of the electronic devices that are being powered by the batteries. However, as the size of batteries decreases, the capacity to power electronic devices often decreases, as well. Decreases in battery capacity due to the reduction in the size of batteries can limit the functionality of electronic devices and/or degrade a user's experience.

One current thin battery package design includes stacked electrodes of alternating polarity. In order to provide external contacts to the current collectors of each electrode, i.e. conductive or metal layers of each electrode, portions of each electrode active areas are recessed to expose the underlying current collectors. The exposed portions are generally in alignment. However, since each electrode has a different polarity, the exposed portions of the current collectors for electrodes of one polarity are aligned with holes or vias within the current collectors of the electrodes having the opposite polarity. Since each electrode is separated by a separator layer, the separator layer also needs to be recessed in alignment with the exposed current collectors and holes to allow for a weld from the external contact to pass through the aligned current collectors, holes and recessed regions of the separator layer. This involves extra processing and costs in order to create the recessed regions within the separator layers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 5A-5E schematically illustrate an example of a multilayer electro-mechanical connector in the form of a staple-like structure.

FIGS. 6A-6F schematically illustrate an example of a multilayer electro-mechanical connector in the form of a screw/serrated-washer-type arrangement.

FIGS. 7A and 7B schematically illustrate pig-nose-like external contacts coupled to multilayer electro-mechanical connectors.

DETAILED DESCRIPTION

Described herein are battery packages and methods of making battery packages, where the battery packages have a reduced size in relation to typical battery packages. The battery packages described herein utilize multilayer electro-mechanical connectors to couple stacks of electrodes in the battery packages. The multilayer electro-mechanical connectors are configured to pierce and pass through separator layers that separate the electrodes. Thus, the separator layers do not need to be processed to create recessed regions that correspond to recessed regions of layers of electrode layers.

In an implementation, a battery package can include a number of electrodes with each electrode having a recessed region that includes an exposed portion of a conductive layer of the respective electrode. For example, respective electrodes in the battery packages can include a layer of electrode material that is disposed on a conductive layer. The layer of electrode material can be joined to the conductive layer with an adhesive layer. The layer of electrode material can be disposed on a portion of the conductive layer with a recessed region being formed in the layer of electrode material. The recessed region can be formed such that a portion of the conductive layer is exposed. The exposed portions of the conductive layers of the electrodes included in the battery package can be coupled together.

Furthermore, a reduced or smaller battery package can be produced by applying a pattern of electrode material on a metal layer of an electrode. The pattern can include a recessed region of the electrode material that exposes a portion of the metal layer of the electrode. The pattern can also include an offset region that includes an amount of electrode material that corresponds to the amount of electrode material that is absent from the recessed region. Including an offset region in the pattern of electrode material facilitates the production of battery electrodes at line speeds that are comparable to those for typical battery electrodes. Additionally, by producing a smaller battery package according to implementations described herein, less sealing material is needed to provide protection from contamination by air, moisture, particulates and the like.

In accordance with various implementations, multilayer electro-mechanical connectors are provided. The multilayer electro-mechanical connectors pass through aligned exposed portions of alternating current collectors, aligned holes in alternating current collectors and the separator layers. Since the multilayer electro-mechanical connectors are configured to pierce and pass through the separator layers, the separator layers do not need to be processed to create recessed regions that correspond to recessed regions of layers of electrode layers. The multilayer electro-mechanical connectors can be in the form of a staple-like or a screw/serrated-washer-type arrangement.

Figure 1:
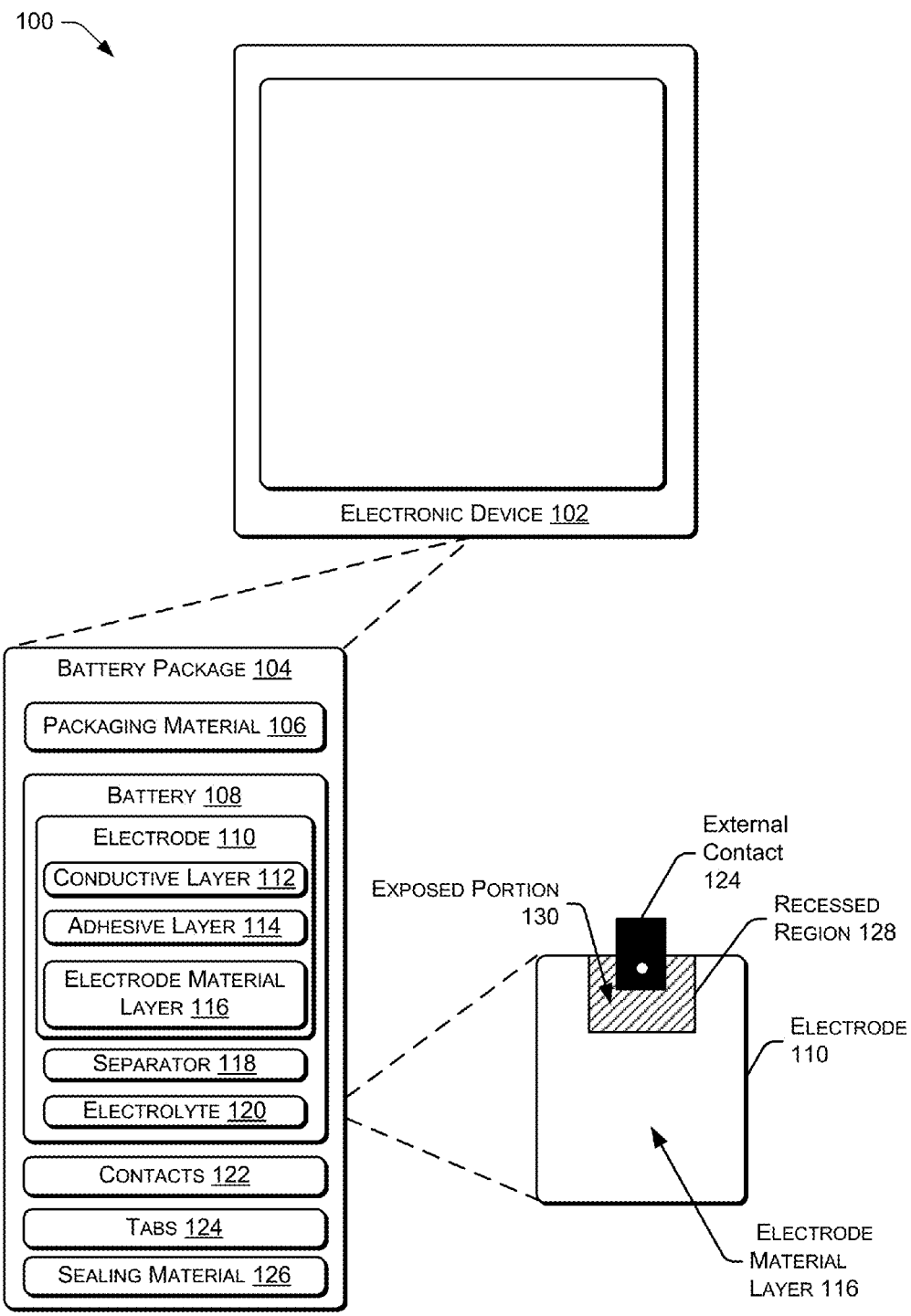
FIG. 1 schematically illustrates an environment that includes an electronic device having a battery package that includes an electrode with a recessed region, where the recessed region includes an exposed portion of a metal layer that is used to form a contact lead.

FIG. 1 illustrates an environment 100 that includes an electronic device 102. The electronic device 102 can include a number of components, such as one or more processors, memory, one or more displays, and one or more interfaces, such as communication interfaces, peripheral device interfaces, and the like. The electronic device 102 can also include one or more input/output devices, such as a keyboard, touchscreen, microphone, speakers, and so forth.

Power for the components of the electronic device 102 can be supplied from a battery package 104. The battery package 104 may be located within a housing of the electronic device 102. In some cases, the battery package 104 may be removable from the electronic device 102, while in other situations, the battery package 104 may be embedded within the electronic device 102. In an implementation, the battery package 104 can have a thickness of about 2 mm, a width of about 100 mm and a length of about 150 mm. These dimensions are merely examples and are not meant to be limiting. The battery package 104 can include packaging material 106 that forms an enclosure for one or more batteries, such as battery 108. The packaging material 106 may minimize exposure of the battery 108 to elements, such as air, water, particulates (e.g., dust), or other materials that may detrimentally affect the operation of the battery 108.

The battery 108 can include a number of electrodes, such as one or more cathodes and one or more anodes. When energy is discharged from the battery 108 to other components of the electronic device 102, an anode of the battery 108 can donate electrons and corresponding ions, such as lithium ions, via oxidation, that travel to the cathode, via an external circuit, for subsequent reduction. When the battery 108 is charged, the cathode can transfer electrons and ions that travel to the anode in order to store energy in the battery 108. In the illustrative example of FIG. 1, the battery 108 includes a representative electrode 110.

The electrode 110 can include a conductive layer 112, an adhesive layer 114, and an electrode material layer 116. In an implementation, the conductive layer 112 can include one or more metals. In some situations, the conductive layer 112 can be referred to as a "current collector." The electrode material layer 116 can be disposed on the conductive layer 112 and the adhesive layer 114 can join the conductive layer 112 to the electrode material layer 116. In some instances, the electrode material layer 116 can be referred to as an "active material layer" or an "electrode active material layer" because the electrode material layer 116 actively allows electrons and ions to be transferred during charging and discharging of the battery 108.

In situations when the electrode 110 is a cathode, the conductive layer 112 can collect current that was provided to other components of the electronic device 102 as the battery 108 is discharging. In situations when the electrode 110 is an anode, the conductive layer 112 can collect current, which is stored in the anode active material (i.e. lithiated graphite) that enters the battery 108 when the battery 108 is charging. The electrode material layer 116 can include materials that couple with ions moving between the anode and cathode. In one example, when the electrode 110 is a cathode that includes electronegative material, the electrode material layer 116 can couple with ions that are donated from an anode including electropositive material. In another example, when the electrode 110 is an anode, the electrode material layer 116 couples with ions that are released from the cathode upon charging.

The battery 108 can also include a respective separator 118 disposed between each anode and cathode. The separator 118 can prevent contact between an anode and cathode of the battery 108 to avoid electrical shorting between the anode and the cathode. The separator 118 can be porous and permeable to the ions travelling between an anode and a cathode of the battery 108. Additionally, the battery 108 can include an electrolyte 120. In some cases, the separator 118 can be infiltrated or activated with the electrolyte 120. In other cases, the separator 118 can include an electrolyte matrix material, such as a polymeric matrix, that is infiltrated or activated with electrolyte. The electrolyte 120 can facilitate the movement of ions between the anode and cathode. In an implementation, the separator 118 and the electrolyte 120 can be a single entity if a solid electrolyte is utilized, e.g., a pliable or soft polymeric or ceramic solid electrolyte. In an illustrative implementation, the ions can include at least one ion from one or more electrode layers 116, non-metallic counter ions or polymeric or ceramic matrix backbone materials that enable transference of ions.

The battery package 104 can also include one or more contacts 122 that enable the battery 108 to provide current to other components of the electronic device 102 and to receive current from a charging device. In an implementation, the one or more contacts 122 can be coupled to the conductive layers 112 of the electrodes 110. For example, when the electrode 110 is an anode, the one or more contacts 122 can be coupled to the conductive layers 112 of the anode. In another example, when the electrode 110 is a cathode, the one or more contacts 122 can be coupled to the conductive layers 112 of the cathode. In some cases, the battery package 104 can include a single anode contact and a single cathode contact.

Furthermore, the battery 108 can include one or more external contacts 124. Each of the one or more external contacts 124 can correspond with a respective contact 122. To illustrate, a contact 122 of an anode can be coupled with a corresponding external contact or tab 124 and a contact 122 of a cathode can also be coupled with a corresponding external contact 124. The one or more external contacts 124 can extend outside of the battery package 104 to couple other components of the electronic device 102 to the battery 108.

The battery package 104 can also include one or more sealing materials 126 to protect the battery 108 from contamination and stabilize materials and components of the electrodes 110 with respect to internal movement within the battery package 104. For example, the one or more sealing materials 126 can be used in locations where the external contacts 124 extend beyond the battery package 104. To illustrate, one or more sealing materials 126 can be placed at a location where the one or more external contacts 124 extend beyond the battery package 104 to prevent contaminants outside of the battery package 104 from entering the battery package 104 at the location where the one or more external contacts 124 extend outside of the battery package 104.

In one implementation, the battery package 104 can include a stack type electrode structure or construct. A stack type battery can include a number of layers or sheets of the electrodes 110 coupled in a vertical or horizontal stack. In another implementation, the battery package 104 can include a winding type electrode structure or construct. The winding type battery can also be referred to as a jelly roll battery or a roll-type battery. A winding type battery can include a number of layers of the electrodes 110 folded or rolled into a cylindrical, elongated rectangle, oval, or prismatic shape. A winding type battery can also include other shapes that are bent or curved to fit particular shapes of objects that contain the battery 108.

FIG. 1 illustrates an electrode 110, such as a cathode or an anode, that includes an electrode material layer 116 and a recessed region 128 of the electrode material layer 116. In an implementation, the electrode material layer 116 can be absent from the recessed region 128 to form an exposed portion 130 of the conductive layer 112. In some situations, the exposed portion 130 can be bonded to an external contact 124. The external contact 124 can form the external electrical conduit for one of the contacts 122 of the battery electrode 110 within the battery package 104.

By forming a recessed region within an electrode material layer of an electrode, a portion of a conductive layer of the electrode is exposed. In this way, multiple conductive layers of electrodes can be coupled to an external contact, as will be described further herein, to thereby improve power performance of the battery 108.

Figure 2:
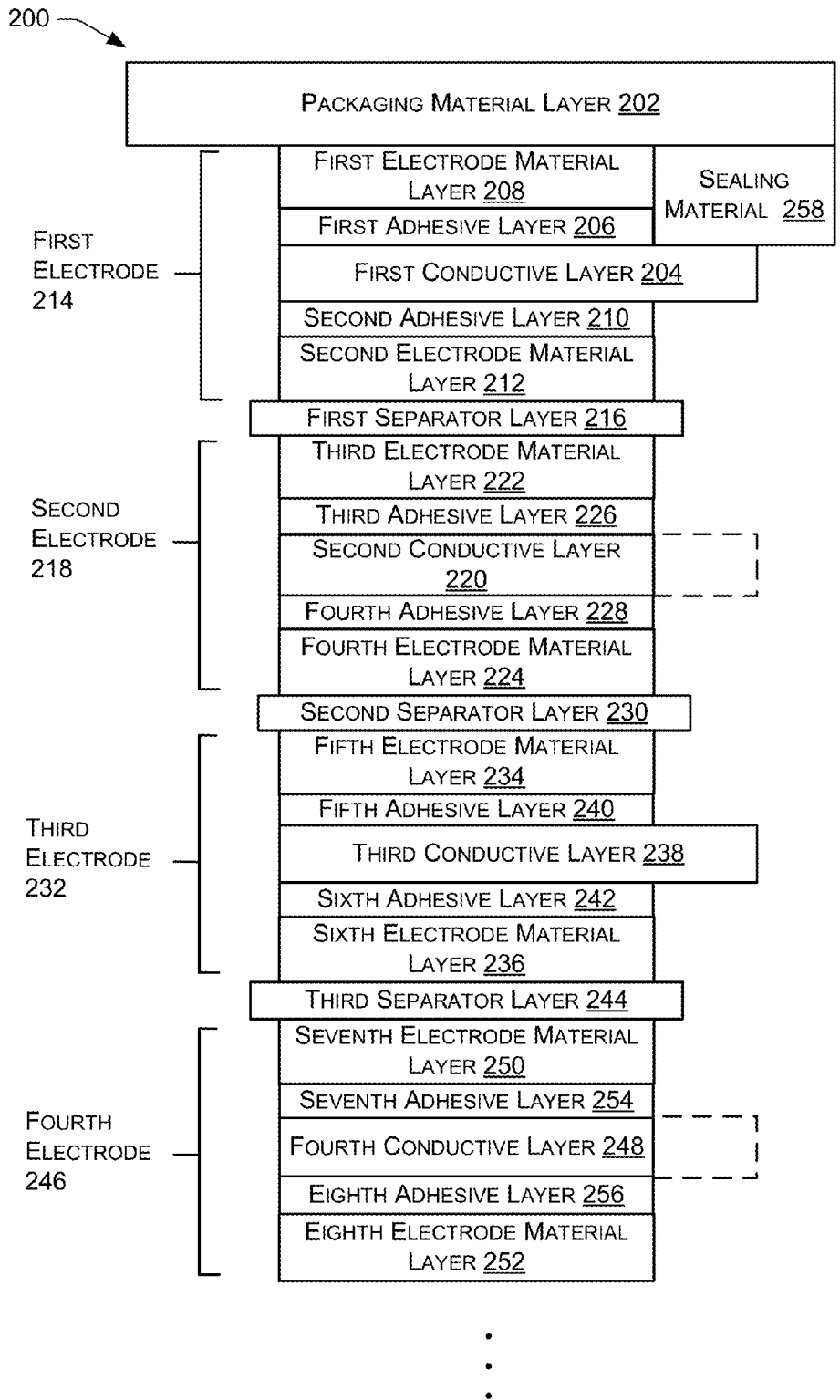
FIG. 2 schematically illustrates a cross-sectional view of an example battery package that includes a plurality of electrodes with each electrode having a recessed region that includes an exposed portion of a conductive layer.

FIG. 2 illustrates a cross-sectional view of an example battery package 200 that includes a plurality of electrodes with each electrode having a recessed region that includes an exposed portion of a conductive layer. The example battery package 200 may be similar to and may be used to implement the battery package 104. In an implementation, the battery package 200 includes a packaging material layer 202. The packaging material layer 202 can form an outer periphery for the battery package 200. For example, in some cases, the packaging material layer 202 can enclose at least a portion of the components of the battery package 200. The packaging material layer 202 can protect components of the battery package 200 from contamination by water, dust, oxygen, and other materials. The packaging material layer 202 can have a thickness of at least about 70 micrometers, at least about 85 micrometers, or at least about 100 micrometers. In some implementations, the packaging material layer 202 can have a thickness no greater than about 200 micrometers, no greater than about 175 micrometers, no greater than about 150 micrometers, or no greater than about 125 micrometers. In an illustrative implementation, the packaging material layer 202 can have a thickness included in a range of about 60 micrometers to about 220 micrometers. In another illustrative implementation, the packaging material layer 202 can have a thickness included in a range of about 80 micrometers to about 120 micrometers. The packaging material layer 202 can include one or more laminate materials. For example, the packaging material layer 202 can include one or more laminated layers including at least one of aluminum, graphene, nylon, polyethylene terephthalate or polypropylene.

The battery package 200 can also include a first conductive layer 204, a first adhesive layer 206 and a first electrode material layer 208. Additionally, the battery package 200 can include a second adhesive layer 210 and a second electrode material layer 212. In the illustrative implementation of FIG. 2, the first conductive layer 204, the first adhesive layer 206, the first electrode material layer 208, the second adhesive layer 210 and the second electrode material layer 212 comprise a first electrode 214. In an implementation, the first electrode 214 can be a cathode. In other implementations, the first electrode 214 can be an anode. In accordance with various implementations, the first electrode 214 does not include the adhesive layers 206, 210 and the first conductive layer 204 is coupled to the electrode material layers 208, 212 without the adhesive layers 206, 210.

In an implementation, the first conductive layer 204 can have a thickness of at least about 10 micrometers, at least about 15 micrometers, or at least about 20 micrometers. Additionally, the first conductive layer 204 can have a thickness no greater than about 50 micrometers, no greater than about 40 micrometers, or no greater than about 30 micrometers. In an illustrative implementation, the first conductive layer 204 can have a thickness included in a range of about 8 micrometers to about 60 micrometers. In another illustrative implementation, the first conductive layer 204 can have a thickness included in a range of about 12 micrometers to about 25 micrometers. When the first electrode 210 is a cathode, the first conductive layer 204 can include at least one of aluminum, nickel, alloys of aluminum or alloys of nickel. When the first electrode 210 is an anode, the first conductive layer 204 can include at least one of copper or alloys of copper.

The first adhesive layer 206 can join a first side of the first conductive layer 204 to the first electrode material layer 208 and the second adhesive layer 210 can join a second side of the first conductive layer 204 to the second electrode material layer 212. At least one of the first adhesive layer 206 or the second adhesive layer 210 can have a thickness of at least about 0.1 micrometers, at least about 0.5 micrometers, at least about 1 micrometer or at least about 5 micrometers. In an implementation, at least one of the first adhesive layer 206 or the second adhesive layer 210 can have a thickness no greater than about 20 micrometers, no greater than about 15 micrometers, or no greater than about 10 micrometers. In an illustrative implementation, at least one of the first adhesive layer 206 or the second adhesive layer 210 can have thickness included in a range of about 0.08 micrometers to about 25 micrometers. In another illustrative implementation, at least one of the first adhesive layer 206 or the second adhesive layer 210 can have a thickness included in a range of about 0.2 micrometers to about 8 micrometers.

At least one of the first adhesive layer 206 or the second adhesive layer 210 can include one or more components. For example, at least one of the first adhesive layer 206 or the second adhesive layer 210 can include at least one of a conductive component or a binder. In some cases, the first adhesive layer 206 can be applied to the first conductive layer 204 and/or the second adhesive layer 210 can be applied to the first conductive layer 204 as a solution that includes a solvent and at least one of the conductive component or the binder. In an implementation, the conductive component of at least one of the first adhesive layer 206 or the second adhesive layer 210 can include carbon. In a particular implementation, the conductive component can include at least one of carbon black, graphite, carbon nanotubes or graphene. In some cases, the conductive component of at least one of the first adhesive layer 206 or the second adhesive layer 210 can include one or more polymeric materials. In various implementations, the conductive composite component can include a polymeric nanostructure having a conductive filler, such as a carbon filler. A binder for at least one of the first adhesive layer 206 or the second adhesive layer 210 can include one or more polyimide-based materials. In an illustrative implementation, the binder can include at least one of poly(acrylic acid), polyethylene oxide, poly(vinyl alcohol), poly(vinylidene fluoride), carboxymethyl cellulose, polyvinyl pyrrolidone or polytetrafluoroethylene. Further, the solvent used to apply the at least one of the conductive component and/or the binder to the first conductive layer 204 can include at least one of N-Methyl-2-Pyrrolidone (NMP), another suitable organic solvent or a water-based solution. The solvent or a mixture of solvents utilized to apply the at least one of the conductive component or the binder to the first conductive layer 204 can depend on at least one of dispersion of the binder in the solvent or mixture of solvents or the ability of the binder to dissolve in the solvent or mixture of solvents.

In an implementation, at least one of the first electrode material layer 208 or the second electrode material layer 212 can have a thickness of at least about 10 micrometers, at least about 50 micrometers, at least about 100 micrometers, or at least about 200 micrometers. In other implementations, at least one of the first electrode material layer 208 or the second electrode material layer 212 can have a thickness no greater than about 500 micrometers, no greater than about 400 micrometers, no greater than about 300 micrometers, or no greater than about 250 micrometers. In an illustrative implementation, at least one of the first electrode material layer 208 or the second electrode material layer 212 can have a thickness included in a range of about 10 micrometers to about 500 micrometers. In another illustrative implementation, at least one of the first electrode material layer 208 or the second electrode material layer 212 can have a thickness included in a range of about 25 micrometers to about 100 micrometers.

The first electrode material layer 208 can be applied to the first adhesive layer 206 using a coating process and/or the second electrode material layer 212 can be applied to the second adhesive layer 210 using a coating process. In some cases, the first electrode material layer 208 can be applied to the first adhesive layer 206 and/or the second electrode material layer 212 can be applied to the second adhesive layer 210 using a slot die coating process. In other situations, the first electrode material layer 208 can be applied to the first adhesive layer 206 and/or the second electrode material layer 212 can be applied to the second adhesive layer 210 using a gravure coating process. In an implementation, at least one of the first electrode material layer 208 or the second electrode material layer 212 can include one or more components, such as at least one of a binder, a conductive filler or an active material. The active material can store and transfer electrons and ions. In an implementation, at least one of the active material of the first electrode material layer 208 or the active material of the second electrode material layer 212 can include at least one of $LiCoO_2$, $Li_xV_2O_5$, $LiFePO_4$, $Li(Ni_xCo_yMn_z)O_2$, $Li(Ni_xCo_yAl_z)O_2$ or $xLi_2MnO_3 \cdot (1-x)LiMO_2$ or other layered structures or off-stoichiometric variants. In various implementations, at least one of the active material of the first electrode material layer 208 or the active material of the second electrode material layer 212 can also include another suitable electronegative Li ion host material. At least one of a binder of the first electrode material layer 208 or a binder of the second electrode material layer 212 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy. Further, the solvent used to apply the at least one of the conductive component, the binder or the active material to the first adhesive layer 206 and/or the second adhesive layer 210 can include at least one of N-Methyl-2-Pyrrolidone (NMP), another suitable organic solvent or a water-based solution.

The battery package 200 can also include a first separator layer 216 that enables ions to flow between the first electrode 214 and a second electrode 218. The first separator layer 216 can have a thickness of at least about 10 micrometers, at least about 15 micrometers, or at least about 20 micrometers. Additionally, the first separator layer 216 can have a thickness no greater than about 75 micrometers, no greater than about 50 micrometers, or no greater than about 25 micrometers. In an illustrative implementation, the first separator layer 216 can have a thickness included in a range of about 8 micrometers to about 100 micrometers. In another illustrative implementation, the first separator layer 216 can have a thickness included in a range of about 12 micrometers to about 35 micrometers. In various implementations, the first separator layer 216 can include a porous and a substantially chemically and electrically inert material. In some cases, the first separator layer 216 can include at least one of polyethylene or polypropylene or other laminated stacks of polymeric materials, which include ceramic coating materials.

In some situations, at least one of the first separator layer 216, the first electrode material layer 208 or the second electrode material layer 212 can include one or more electrolytes. The one or more electrolytes can be included in a liquid material in some scenarios, while being included in a solid material in other scenarios. In still other cases, the one or more electrolytes can be included in a gel.

The second electrode 218 can include a second conductive layer 220 having a third electrode material layer 222 disposed on a first side of the second conductive layer 220 and a fourth electrode material layer 224 disposed on a second side of the second conductive layer 220. The third electrode material layer 222 can be joined to the second conductive layer 220 using a third adhesive layer 226 and the fourth electrode material layer 224 can be joined to the second conductive layer 220 using a fourth adhesive layer 228. In some cases, the second electrode 218 can have a different polarity than a polarity of the first electrode 214. In one example, the second electrode 218 can be an anode when the first electrode 214 is a cathode. In another example, the second electrode 218 can be a cathode when the first electrode 214 is an anode. In accordance with various implementations, the second electrode 218 does not include the adhesive layers 226, 228 and the second conductive layer 220 is coupled to the electrode material layers 222, 224 without the adhesive layers 226, 228.

In an implementation, at least one of the third electrode material layer 222 or the fourth electrode material layer 224 can have a thickness of at least about 10 micrometers, at least about 50 micrometers, at least about 100 micrometers, or at least about 200 micrometers. In other implementations, at least one of the third electrode material layer 222 or the fourth electrode material layer 224 can have a thickness no greater than about 500 micrometers, no greater than about 400 micrometers, no greater than about 300 micrometers, or no greater than about 250 micrometers. In an illustrative implementation, at least one of the third electrode material layer 222 or the fourth electrode material layer 224 can have a thickness included in a range of about 10 micrometers to about 500 micrometers. In another illustrative implementation, at least one of the third electrode material layer 222 or the fourth electrode material layer 224 can have a thickness included in a range of about 25 micrometers to about 100 micrometers.

In an implementation, at least one of the third electrode material layer 222 or the fourth electrode material layer 224 can include one or more components, such as at least one of a binder, a conductive filler or an active material. The active material can store and transfer electrons and ions. In some implementations, the active material of at least one of the third electrode material layer 222 or the fourth electrode material layer 224 can include at least one of carbon (such as graphite, amorphous carbon or a hybrid of graphite and amorphous carbon), $Li_4Ti_5O_{12}$, silicon, germanium, tin, antimony, aluminum, or magnesium. In various implementations, the active material of at least one of the third electrode material layer 222 or the fourth electrode material layer 224 can also include another suitable electropositive Li ion host material. The active material of at least one of the third electrode material layer 222 or the fourth electrode material layer 224 can have one or more structures, such as nanowires, nanotubes, nanoscrolls, nanosheets, nano-core-shell structures, hollow nanowires hollow nanospheres, nanospheres, or nanoparticles. A binder of at least one of the third electrode material layer 222 or the fourth electrode material layer 224 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy.

The third adhesive layer 226 can join the second conductive layer 220 to the third electrode material layer 222 and the fourth adhesive layer 228 can join the second conductive layer 220 to the fourth electrode material layer 224. At least one of the third electrode material layer 222 can be applied to the third adhesive layer 226 and the fourth electrode material layer 224 can be applied to the fourth adhesive layer 228 using a coating process. In some cases, at least one of the third electrode material layers 222 can be applied to the third adhesive layer 226 or the fourth electrode material layer 224 can be applied to the fourth adhesive layer 228 using a slot die coating process. In other situations, at least one of the third electrode material layer 222 can be applied to the third adhesive layer 226 or the fourth electrode material layer 224 can be applied to the fourth adhesive layer 228 using a gravure coating process. Further, a solvent used to apply the at least one of the conductive component of the third electrode material layer 222, the active material of the third electrode material layer 224, or the binder of the third electrode material layer 222 to the third adhesive layer 226 can include at least one of N-Methyl-2-Pyrrolidone (NMP), another suitable organic solvent or a water-based solution. Additionally, a solvent used to apply the at least one of the conductive component of the fourth electrode material layer 224, the active material of the fourth electrode material layer 224, or the binder of the fourth electrode material layer 224 to the fourth adhesive layer 228 can also include at least one of N-Methyl-2-Pyrrolidone (NMP), another suitable organic solvent or a water-based solution.

At least one of the third adhesive layer 226 or the fourth adhesive layer 228 can have a thickness of at least about 0.1 micrometers, at least about 0.5 micrometers, at least about 1 micrometer or at least about 5 micrometers. In an implementation, at least one of the third adhesive layer 226 or the fourth adhesive layer 228 can have a thickness no greater than about 20 micrometers, no greater than about 15 micrometers, or no greater than about 10 micrometers. In an illustrative implementation, at least one of the third adhesive layer 226 or the fourth adhesive layer 228 can have thickness included in a range of about 0.08 micrometers to about 25 micrometers. In another illustrative implementation, at least one of the third adhesive layer 226 or the fourth adhesive layer 228 can have a thickness included in a range of about 0.2 micrometers to about 8 micrometers.

In an implementation, the second conductive layer 220 can have a thickness of at least about 10 micrometers, at least about 15 micrometers, or at least about 20 micrometers. Additionally, the second conductive layer 220 can have a thickness no greater than about 50 micrometers, no greater than about 40 micrometers, or no greater than about 30 micrometers. In an illustrative implementation, the second conductive layer 220 can have a thickness included in a range of about 8 micrometers to about 60 micrometers. In another illustrative implementation, the second conductive layer 220 can have a thickness included in a range of about 12 micrometers to about 25 micrometers. The second conductive layer 220 can include at least one of aluminum, nickel, copper, alloys of aluminum, alloys of nickel, or alloys of copper.

Additionally, the battery package 200 can also include a second separator layer 230 that enables ions to flow between the second electrode 218 and a third electrode 232. The second separator layer 230 can have a thickness of at least about 10 micrometers, at least about 15 micrometers, or at least about 20 micrometers. Additionally, the second separator layer 230 can have a thickness no greater than about 75 micrometers, no greater than about 50 micrometers, or no greater than about 25 micrometers. In an illustrative implementation, the second separator layer 230 can have a thickness included in a range of about 8 micrometers to about 100 micrometers. In another illustrative implementation, the second separator layer 230 can have a thickness included in a range of about 12 micrometers to about 35 micrometers. In various implementations, the second separator layer 230 can include a porous and a substantially chemically and electrically inert material. In some cases, the second separator layer 230 can include at least one of polyethylene or polypropylene or laminated polymeric materials thereof.

In some situations, at least one of the second separator layer 230, the third electrode material layer 222 or the fourth electrode material layer 224 can include one or more electrolytes. The one or more electrolytes can be included in a liquid material in some scenarios, while being included in a solid material in other scenarios. In still other cases, the one or more electrolytes can be included in a gel.

The third electrode 232 can include a fifth electrode material layer 234 and a sixth electrode material layer 236 disposed on a third conductive layer 238. The fifth electrode material layer 234 can be joined to a first side of the third conductive layer 238 with a fifth adhesive layer 240 and the sixth electrode material layer 236 can be joined to a second side of the third conductive layer 238 with a sixth adhesive layer 242. In accordance with various implementations, the third electrode 232 does not include the adhesive layers 240, 242 and the third conductive layer 238 is coupled to the electrode material layers 234, 236 without the adhesive layers 240, 242. In some scenarios, the third electrode 230 can have a same polarity as the first electrode 214 and a different polarity from the second electrode 218. In one example, the first electrode 214 and the third electrode 232 can be cathodes and the second electrode 218 can be an anode. In another example, the first electrode 214 and the third electrode 232 can be anodes and the second electrode 218 can be a cathode.

In an implementation, at least one of the fifth electrode material layer 234 or the sixth electrode material layer 236 can have a thickness of at least about 10 micrometers, at least about 50 micrometers, at least about 100 micrometers, or at least about 200 micrometers. In other implementations, at least one of the fifth electrode material layer 234 or the sixth electrode material layer 236 can have a thickness no greater than about 500 micrometers, no greater than about 400 micrometers, no greater than about 300 micrometers, or no greater than about 250 micrometers. In an illustrative implementation, at least one of the fifth electrode material layer 234 or the sixth electrode material layer 236 can have a thickness included in a range of about 10 micrometers to about 500 micrometers. In another illustrative implementation, at least one of the fifth electrode material layer 234 or the sixth electrode material layer 236 can have a thickness included in a range of about 25 micrometers to about 100 micrometers.

The fifth electrode material layer 234 can be applied to the fifth adhesive layer 240 and/or the sixth electrode material layer 236 can be applied to the sixth adhesive layer 242 using a coating process. In some cases, the fifth electrode material layer 234 can be applied to the third adhesive layer 232 and/or the sixth electrode material layer 236 can be applied to the sixth adhesive layer 242 using a slot die coating process. In other situations, the fifth electrode material layer 234 can be applied to the fifth adhesive layer 240 and/or the sixth electrode material layer 236 can be applied to the sixth adhesive layer 242 using a gravure coating process. In an implementation, at least one of the fifth electrode material layer 234 or the sixth electrode material layer 236 can include one or more components, such as at least one of a binder, a conductive filler or an active material. The active material can store and transfer electrons and ions. In an implementation, at least one of the active material of the fifth electrode material layer 234 or the active material of the sixth electrode material layer 238 can include at least one of $LiCoO_2$, $Li_xV_2O_5$, $LiFePO_4$, $Li(Ni_xCo_yMn_z)O_2$, $Li(Ni_xCo_yAl_z)O_2$ or $xLi_2MnO_3.(1-x)LiMO_2$ or other layered structures or off-stoichiometric variants. In various implementations, at least one of the active material of the fifth electrode material layer 234 or the active material of the sixth electrode material layer 236 can also include another suitable electronegative Li ion host material. At least one of a binder of the fifth electrode material layer 234 or the sixth electrode material layer 236 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy. Further, the solvent used to apply the at least one of the conductive component, the binder or the active material of the fifth electrode material layer 234 to the fifth adhesive layer 240 and/or the solvent used to apply the at least one of the conductive component, the binder or the active material of the sixth electrode material layer 236 to the sixth adhesive layer 242 can include at least one of N-Methyl-2-Pyrrolidone (NMP), another suitable organic solvent or a water-based solution.

In an implementation, the third conductive layer 238 can have a thickness of at least about 10 micrometers, at least about 15 micrometers, or at least about 20 micrometers. Additionally, the third conductive layer 238 can have a thickness no greater than about 50 micrometers, no greater than about 40 micrometers, or no greater than about 30 micrometers. In an illustrative implementation, the third conductive layer 238 can have a thickness included in a range of about 8 micrometers to about 60 micrometers. In another illustrative implementation, the third conductive layer 238 can have a thickness included in a range of about 12 micrometers to about 25 micrometers. When the third electrode 232 is a cathode, the third conductive layer 238 can include at least one of aluminum, nickel, alloys of aluminum, or alloys of nickel. When the third electrode 232 is an anode, the third conductive layer 238 can include at least one of copper or alloys of copper.

At least one of the fifth adhesive layer 240 or the sixth adhesive layer 242 can have a thickness of at least about 0.1 micrometers, at least about 0.5 micrometers, at least about 1 micrometer or at least about 5 micrometers. In an implementation, at least one of the fifth adhesive layer 240 or the sixth adhesive layer 242 can have a thickness no greater than about 20 micrometers, no greater than about 15 micrometers, or no greater than about 10 micrometers. In an illustrative implementation, at least one of the fifth adhesive layer 240 or the sixth adhesive layer 242 can have thickness included in a range of about 0.08 micrometers to about 25 micrometers. In another illustrative implementation, at least one of the fifth adhesive layer 240 or the sixth adhesive layer 242 can have a thickness included in a range of about 0.2 micrometers to about 8 micrometers.

At least one of the fifth adhesive layer 240 or the sixth adhesive layer 242 can include one or more components. For example, at least one of the fifth adhesive layer 240 or the sixth adhesive layer 242 can include at least one of a conductive component or a binder. In some cases, the fifth adhesive layer 240 can be applied to the third conductive layer 238 and/or the sixth adhesive layer 242 can be applied to the third conductive layer 238 as a solution that includes a solvent and at least one of the conductive component or the binder. In an implementation, the conductive component of at least one of the fifth adhesive layer 240 or the sixth adhesive layer 242 can include carbon. In a particular implementation, the conductive component can include at least one of carbon black, graphite, carbon nanotubes or graphene. In some cases, the conductive component of the fifth adhesive layer 240 and/or the conductive component of the sixth adhesive layer 242 can include one or more polymeric materials. In various implementations, the conductive composite component can include a polymeric nanostructure having a conductive filler, such as a carbon filler. At least one of a binder for the fifth adhesive layer 240 or a binder of the sixth adhesive layer 242 can include one or more polyimide-based materials. In an illustrative implementation, the binder can include at least one of poly acrylic acid, polyethylene oxide, poly vinyl alcohol, poly vinylidene fluoride, carboxymethyl cellulose, polyvinyl pyrrolidone or polytetrafluoroethylene. Further, the solvent used to apply the at least one of the conductive component and/or the binder of at least one of the fifth adhesive layer 240 or the sixth adhesive layer 242 to the third conductive layer 238 can include at least one of N-Methyl-2-Pyrrolidone (NMP), another suitable organic solvent or a water-based solution. The solvent or a mixture of solvents utilized to apply the at least one of the conductive component or the binder of at least one of the fifth adhesive layer 240 or the sixth adhesive layer 242 to the third conductive layer 238 can depend on at least one of dispersion of the binder in the solvent or mixture of solvents or the ability of the binder to dissolve in the solvent or mixture of solvents.

Further, the battery package 200 can also include a third separator layer 244 that enables ions to flow between the third electrode 232 and a fourth electrode 246. The third separator layer 244 can have a thickness of at least about 10 micrometers, at least about 15 micrometers, or at least about 20 micrometers. Additionally, the third separator layer 244 can have a thickness no greater than about 75 micrometers, no greater than about 50 micrometers, or no greater than about 25 micrometers. In an illustrative implementation, the third separator layer 244 can have a thickness included in a range of about 8 micrometers to about 100 micrometers. In another illustrative implementation, the third separator layer 244 can have a thickness included in a range of about 12 micrometers to about 35 micrometers. In various implementations, the third separator layer 244 can include a porous and a substantially chemically and electrically inert material. In some cases, the third separator layer 244 can include at least one of polyethylene or polypropylene or laminated polymeric materials thereof.

The fourth electrode 246 can include a fourth conductive layer 248 having a seventh electrode material layer 250 disposed on a first side of the fourth conductive layer 248 and a eighth electrode material layer 252 disposed on a second side of the fourth conductive layer 248. The seventh electrode material layer 250 can be joined to the fourth conductive layer 248 using a seventh adhesive layer 254 and the eighth electrode material layer 252 can be joined to the fourth conductive layer 248 using an eighth adhesive layer 256. In accordance with various implementations, the fourth electrode 246 does not include the adhesive layers 254, 256 and the fourth conductive layer 248 is coupled to the electrode material layers 250, 252 without the adhesive layers 254, 256. In some cases, the fourth electrode 246 can have a different polarity than a polarity of the first electrode 214 and/or the third electrode 232 and the same polarity as the second electrode 218. In one example, the fourth electrode 246 can be an anode when the first electrode 214 and the third electrode 232 are cathodes. In another example, the fourth electrode 246 can be a cathode when the first electrode 214 and the third electrode 232 are anodes.

In an implementation, at least one of the seventh electrode material layer 250 or the eighth electrode material layer 252 can have a thickness of at least about 10 micrometers, at least about 50 micrometers, at least about 100 micrometers, or at least about 200 micrometers. In other implementations, at least one of the seventh electrode material layer 250 or the eighth electrode material layer 252 can have a thickness no greater than about 500 micrometers, no greater than about 400 micrometers, no greater than about 300 micrometers, or no greater than about 250 micrometers. In an illustrative implementation, at least one of the seventh electrode material layer 250 or the eighth electrode material layer 252 can have a thickness included in a range of about 10 micrometers to about 500 micrometers. In another illustrative implementation, at least one of the seventh electrode material layer 250 or the eighth electrode material layer 252 can have a thickness included in a range of about 25 micrometers to about 100 micrometers.

In an implementation, at least one of the seventh electrode material layer 250 or the eighth electrode material layer 252 can include one or more components, such as at least one of a binder, a conductive filler or an active material. The active material can store and transfer electrons and ions. In some implementations, the active material of at least one of the seventh electrode material layer 250 or the eighth electrode material layer 252 can include at least one of carbon (such as graphite, amorphous carbon or a hybrid of graphite and amorphous carbon), $Li_4Ti_5O_{12}$, silicon, germanium, tin, antimony, aluminum, or magnesium. In various implementations, the active material of at least one of the seventh electrode material layer 250 or the eighth electrode material layer 252 can also include another suitable electropositive Li ion host material. The active material of at least one of the seventh electrode material layer 250 or the eighth electrode material layer 252 can have one or more structures, such as nanowires, nanotubes, nanoscrolls, nanosheets, nano-core-shell structures, hollow nanowires hollow nanospheres, nanospheres, or nanoparticles. A binder of at least one of the seventh electrode material layer 250 or the eighth electrode material layer 252 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy.

In some situations, at least one of the third separator layer 244, the fifth electrode material layer 234, the sixth electrode material layer 236, the seventh electrode material layer 250 or the eighth electrode material layer 252 can include one or more electrolytes. The one or more electrolytes can be included in a liquid material in some scenarios, while being included in a solid material in other scenarios. In still other cases, the one or more electrolytes can be included in a gel.

The seventh adhesive layer 254 can join a first side of the fourth conductive layer 248 to the seventh electrode material layer 250 and the eighth adhesive layer 256 can join a second side of the fourth conductive layer 248 to the eighth electrode material layer 252. At least one of the seventh electrode material layer 250 can be applied to the seventh adhesive layer 254 and the eighth electrode material layer 252 can be applied to the eighth adhesive layer 256 using a coating process. In some cases, at least one of the seventh electrode material layer 250 can be applied to the seventh adhesive layer 254 or the eighth electrode material layer 252 can be applied to the eighth adhesive layer 256 using a slot die coating process. In other situations, at least one of the seventh electrode material layer 250 can be applied to the seventh adhesive layer 254 or the eighth electrode material layer 252 can be applied to the eighth adhesive layer 256 using a gravure coating process. Further, a solvent used to apply the at least one of the conductive component of the seventh electrode material layer 250, the active material of the seventh electrode material layer 250, or the binder of the seventh electrode material layer 250 to the seventh adhesive layer 254 can include at least one of N-Methyl-2-Pyrrolidone (NMP), another suitable organic solvent or a water-based solution. Additionally, a solvent used to apply the at least one of the conductive component of the eighth electrode material layer 252, the active material of the eighth electrode material layer 252 or the binder of the eighth electrode material layer 252 to the eighth adhesive layer 256 can also include at least one of N-Methyl-2-Pyrrolidone (NMP), another suitable organic solvent or a water-based solution.

At least one of the seventh adhesive layer 254 or the eighth adhesive layer 256 can have a thickness of at least about 0.1 micrometers, at least about 0.5 micrometers, at least about 1 micrometer or at least about 5 micrometers. In an implementation, at least one of the seventh adhesive layer 254 or the eighth adhesive layer 256 can have a thickness no greater than about 20 micrometers, no greater than about 15 micrometers, or no greater than about 10 micrometers. In an illustrative implementation, at least one of the seventh adhesive layer 254 or the eighth adhesive layer 256 can have thickness included in a range of about 0.08 micrometers to about 25 micrometers. In another illustrative implementation, at least one of the seventh adhesive layer 254 or the eighth adhesive layer 256 can have a thickness included in a range of about 0.2 micrometers to about 8 micrometers.

In an implementation, the fourth conductive layer 248 can have a thickness of at least about 10 micrometers, at least about 15 micrometers, or at least about 20 micrometers. Additionally, the fourth conductive layer 248 can have a thickness no greater than about 50 micrometers, no greater than about 40 micrometers, or no greater than about 30 micrometers. In an illustrative implementation, the fourth conductive layer 248 can have a thickness included in a range of about 8 micrometers to about 60 micrometers. In another illustrative implementation, the fourth conductive layer 248 can have a thickness included in a range of about 12 micrometers to about 25 micrometers. The fourth conductive layer 248 can include at least one of aluminum, nickel, copper, alloys of aluminum, alloys of nickel, or alloys of copper.

Openings or holes are also provided within the conductive layers 204, 220, 238 and 248, as well as the adhesive layers 206, 210, 226, 228, 240, 242, 254, and 256 and the electrode material layers 208, 212, 222, 224, 234, 236, 250, and 252 that will be discussed with reference to FIGS. 3A and 3B herein. The openings can be formed by removing a portion of the conductive layers 204, 220, 238 and 248, as well as the adhesive layers 206, 210, 226, 228, 240, 242, 254, and 256 and the electrode material layers 208, 212, 222, 224, 234, 236, 250, and 252, such as via a punch process.

The battery package 200 also includes a sealing material 258 that can be disposed around the packaging material layer 202 to minimize contamination of the battery package 200.

Although the illustrative implementation of FIG. 2 shows the battery package 200 including the first electrode 214, the second electrode 218, the third electrode 232 and the fourth electrode 246, the battery package 200 can include one or more additional electrodes, sandwiched between the packaging material layer 202 for a completely hermetic seal of the battery package 200. In some cases, the battery package 200 can include one or more additional electrodes having a same polarity as the second electrode 218 and the fourth electrode 246.

Figure 3A:
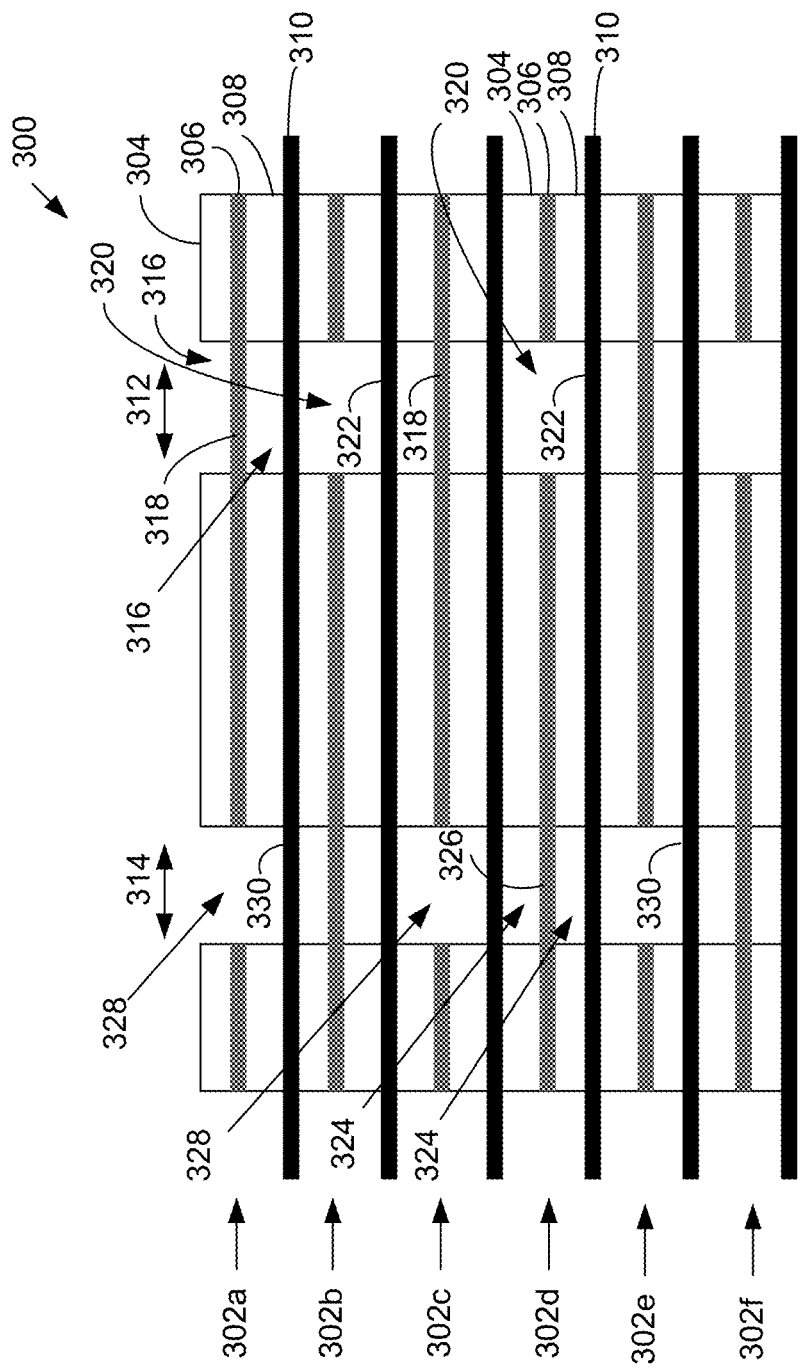
FIGS. 3A and 3B schematically illustrate an example of a battery arrangement similar to the battery package illustrated in FIG. 2 and illustrate pathways between various layers of the battery arrangement.
Figure 3B:
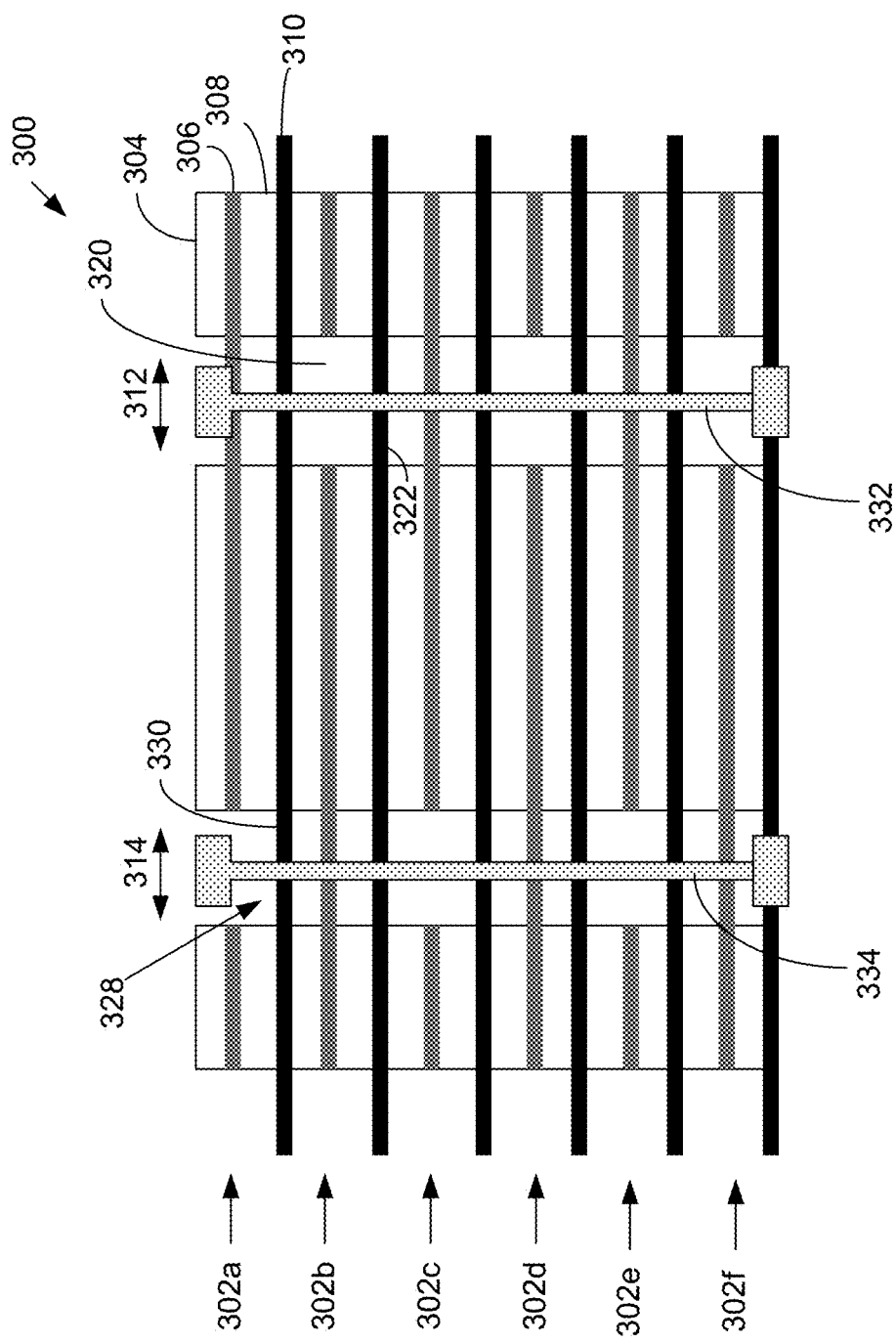

FIGS. 3A and 3B schematically illustrate an example of a battery arrangement 300 similar to the battery package 200 and illustrate pathways between various electrode layers of the battery arrangement 300. More particularly, the battery arrangement 300 schematically illustrates stacks of electrodes of the battery package 200 and does not include the packaging material 202. The example battery arrangement 300 may be used to implement battery package 200. The example battery arrangement 300 of FIGS. 3A and 3B generally includes six double-sided electrodes 302 and thus, is a six cell battery package. More or less electrodes 302 may be included depending upon the application. The battery arrangement 300 schematically illustrates the stack of electrodes illustrated in FIG. 2 (e.g., electrodes 214, 218, 232 and 246) without the packaging material layer 202.

Each electrode 302 includes a first electrode material layer 304 disposed on a metal layer 306, which is disposed on a second electrode material layer 308. Each electrode 302 is separated by a separator layer 310. Other components as described with respect to FIGS. 1 and 2 may be included in the battery arrangement 300, but are not illustrated in the example implementation of FIGS. 3A and 3B for clarity.

Each electrode 302 has a polarity. In accordance with various implementations, the first, third and fifth electrodes 302a, 302c and 302e have the same polarity, while the second, fourth and sixth electrodes 302b, 302d and 302f have the same polarity, which is different from the polarity of the first, third and fifth electrodes 302a, 302c and 302e. Two connection pathways 312, 314 are defined within the battery arrangement 300. The two connection pathways 312, 314 can have a width in a range of 8 to 12 mm. A first connection pathway 312 has recessed regions 316 of the first and second electrode material layers 304, 308 to expose the metal layers 306 in the first connection pathway 312 within the first, third and fifth electrodes 302a, 302c and 302e. The exposed portions 318 of the metal layers 306 within the first, third and fifth electrodes 302a, 302c and 302e are aligned with one another. The first connection pathway 312 further includes holes 320 defined within the second, fourth and sixth electrodes 302b, 302d and 302f that are aligned with the exposed portions 318 of the metal layers 306 within the first connection pathway 312. The first connection pathway 312 also includes portions 322 of the separator layers 310. The second connection pathway 314 includes recessed regions 324 of the first and second electrode material layers 304, 308 within the second, fourth and sixth electrodes 302b, 302d and 302f in order to expose the metal layers 306 of the second, fourth and sixth electrodes 302b, 302d and 302f. The exposed portions 326 of the metal layers 306 within the second, fourth and sixth electrodes 302b, 302d and 302f are aligned with one another. The second connection pathway 314 further includes holes 328 within the first, third and fifth electrodes 302a, 302c and 302e that are aligned with the exposed metal layers 306 within the second connection pathway 314. The second connection pathway 314 further includes portions 330 of the separator layers 310. Thus, the first connection pathway 312 includes a first set of alternating electrodes 302a, 302c and 302e that includes exposed metal layers 306 and a second set of alternating electrodes 302b, 302d and 302f that includes holes defined within the metal layers 306, the first electrode material layers 304 and the second electrode material layers 308, such that electrodes 302 of the first set alternate with electrodes 302 of the second set. Likewise, the second connection pathway 314 includes a first set of alternating electrodes 302b, 302d and 302f that includes exposed metal layers 306 and a second set of alternating electrodes 302a, 302c and 302e that includes holes defined within the metal layers 306 the first electrode material layers 304 and the second electrode material layers 308, such that electrodes 302 of the first set alternate with electrodes of the second set. As can be seen in FIG. 3A, the recessed regions 316 within the electrodes 302a, 302c and 302e are adjacent to the holes 328 within the electrodes 302a, 302c and 302e. Likewise, the recessed regions 324 within the electrodes 302b, 302d and 302f are adjacent to the holes 320 within the electrodes 302b, 302d and 302f.

FIG. 3B illustrates a multilayer electro-mechanical connector 332 inserted within the first connection pathway 312 and a multilayer electro-mechanical connector 334 inserted within the second connection pathway 314. The multilayer electro-mechanical connectors 332, 334 pass through the connection pathways 312, 314 thereby piercing the exposed portions 318, 326 of the metal layers 306 and the portions 322, 330 of the separator layers 310 within the respective connection pathways 312, 314. More particularly, the multilayer electro-mechanical connector 332 pierces the exposed portions 318 of the metal layers 306 within the first connection pathway 312 of the first, third and fifth electrodes 302a, 302c and 302e. Thus, the multilayer electro-mechanical connector 332 electrically couples the first, third and fifth electrodes 302a, 302c and 302e having the same polarity with each other while also mechanically coupling all of the electrodes 302 via the piercing of the portions 322 of the separator layers 310. The multilayer electro-mechanical connector 334 pierces the exposed portions 326 of the metal layers 306 within the second connection pathway 314 of the second, fourth and sixth electrodes 302b, 302d and 302f. Thus, the multilayer electro-mechanical connector 334 electrically couples the second, fourth and sixth electrodes 302b, 302d and 302f, which have the same polarity, as well as mechanically coupling all of the electrodes 302 by piercing of the portions 330 of the separator layers 310.

Figure 4C:
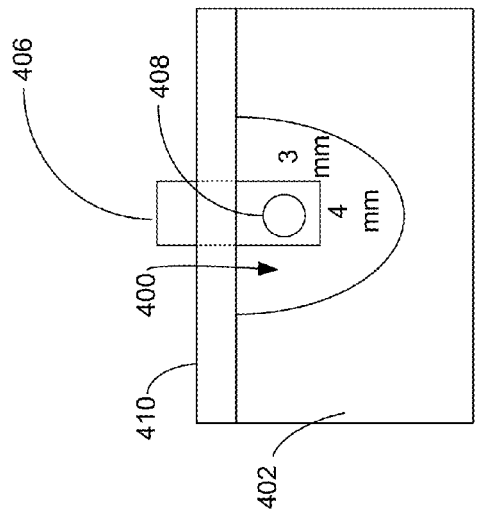
FIGS. 4A-4C schematically illustrate a recessed region of an electrode.
Figure 4B:
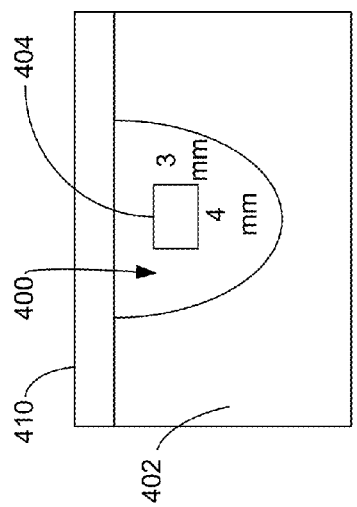
Figure 4A:
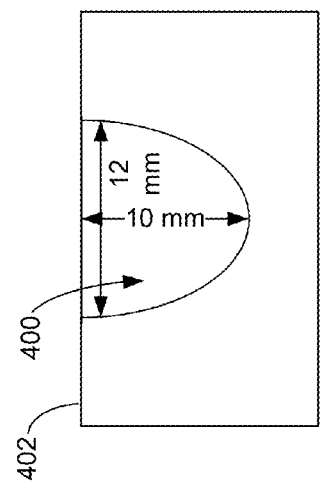

FIG. 4A illustrates a recessed region 400 of an electrode material layer 402, such as electrode material layers 304, 308, that has the dimensions of approximately 12 millimeters (mm) wide and 10 mm deep. FIG. 4B illustrates a multilayer electro-mechanical connector 404, such as multilayer electro-mechanical connectors 332, 334, penetrating the recessed region 400. In accordance with various implementations, the multilayer electro-mechanical connector 404 has dimensions of approximately 3 mm by 4 mm. FIG. 4C illustrates an example of an external contact in the form of a flat tab 406 welded via a weld 408 to the multilayer electro-mechanical connector 404. As can be seen in FIG. 4C, the flat tab 408 projects outward from the recessed region 400 beyond packaging material 410 of a battery package that includes the electrode material layer 402.

Figure 5B:
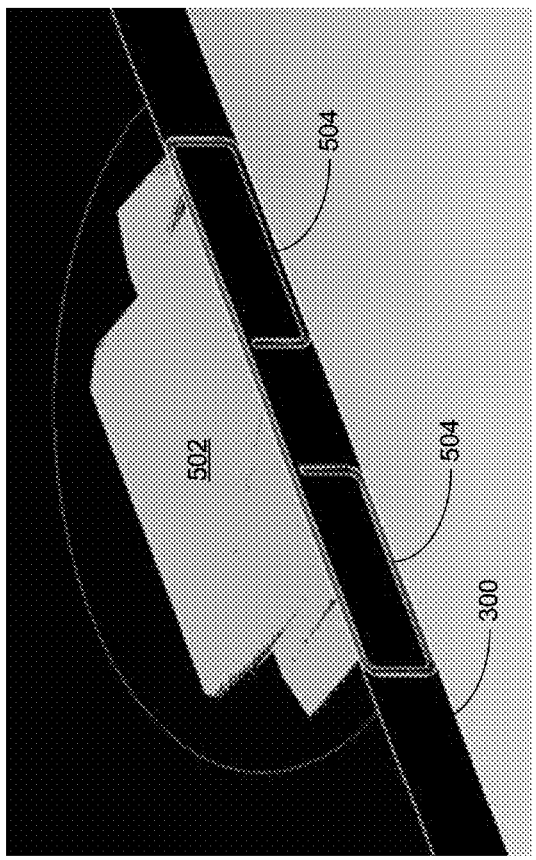
Figure 5D:
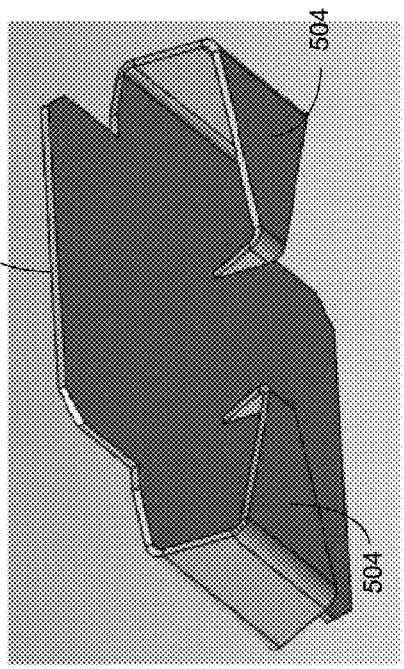
Figure 5C:
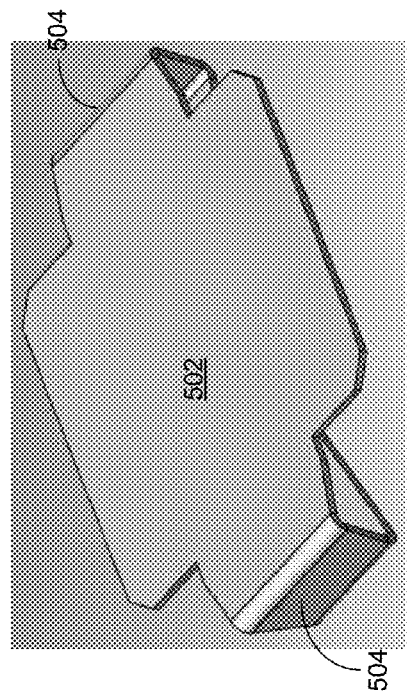
Figure 5E:
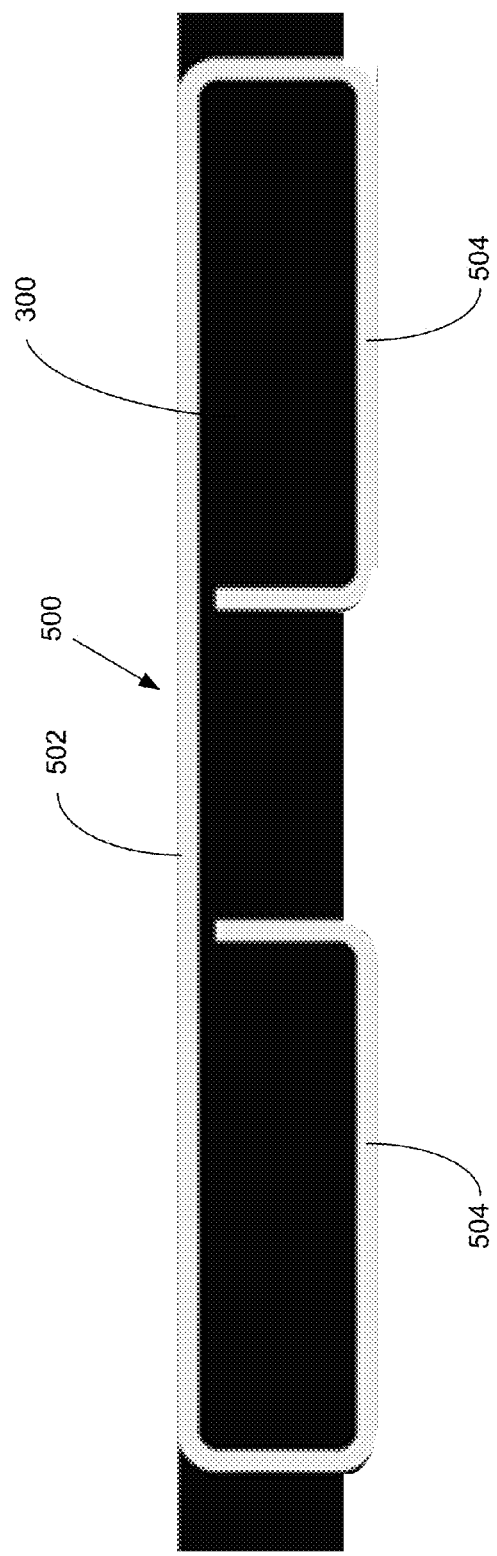

Referring to FIGS. 5A-5E, in accordance with various implementations, the multilayer electro-mechanical connectors 332, 334 each comprise a staple 500, or a staple-like device similar to the staple 500 as described herein. The staple 500 includes a body 502 and two prongs 504. The staple 500 is inserted into a corresponding pathway 312, 314, thereby piercing and extending through the corresponding exposed metal layers 306 and the separator layers 310. The staple is then secured by folding over the prongs 504, as is typically done with staples, and as can be seen in FIGS. 5B-5E. Thus, the staple 500 electrically couples the exposed metal layers 306 within the corresponding pathway 312, 314, while also mechanically coupling the various layers of the battery arrangement 300. FIG. 5A schematically illustrates a top view of a portion of the battery arrangement 300 with the two staples 500 inserted into the corresponding pathways 312, 314 of the battery arrangement 300. FIG. 5E schematically illustrates a cross-sectional view of a portion of the battery arrangement 300 with a staple 500 inserted therein.

Figure 6B:
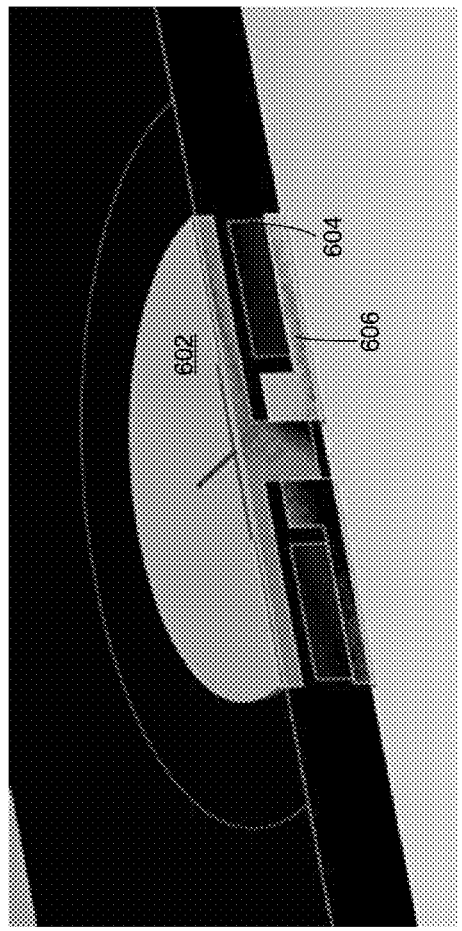
Figure 6D:
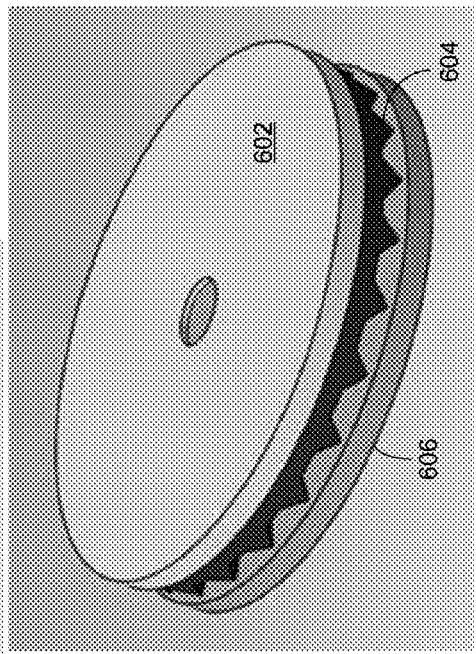
Figure 6C:
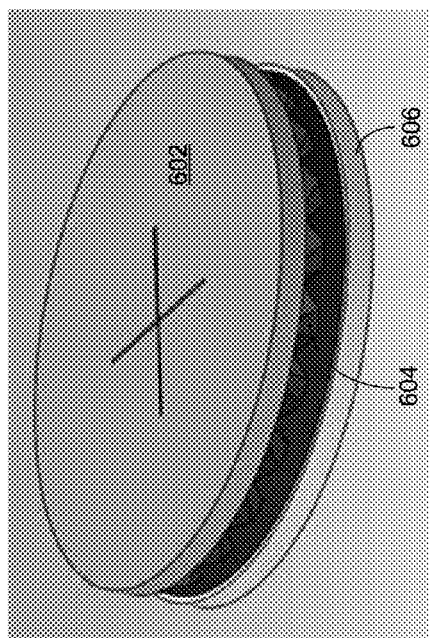
Figure 6E:
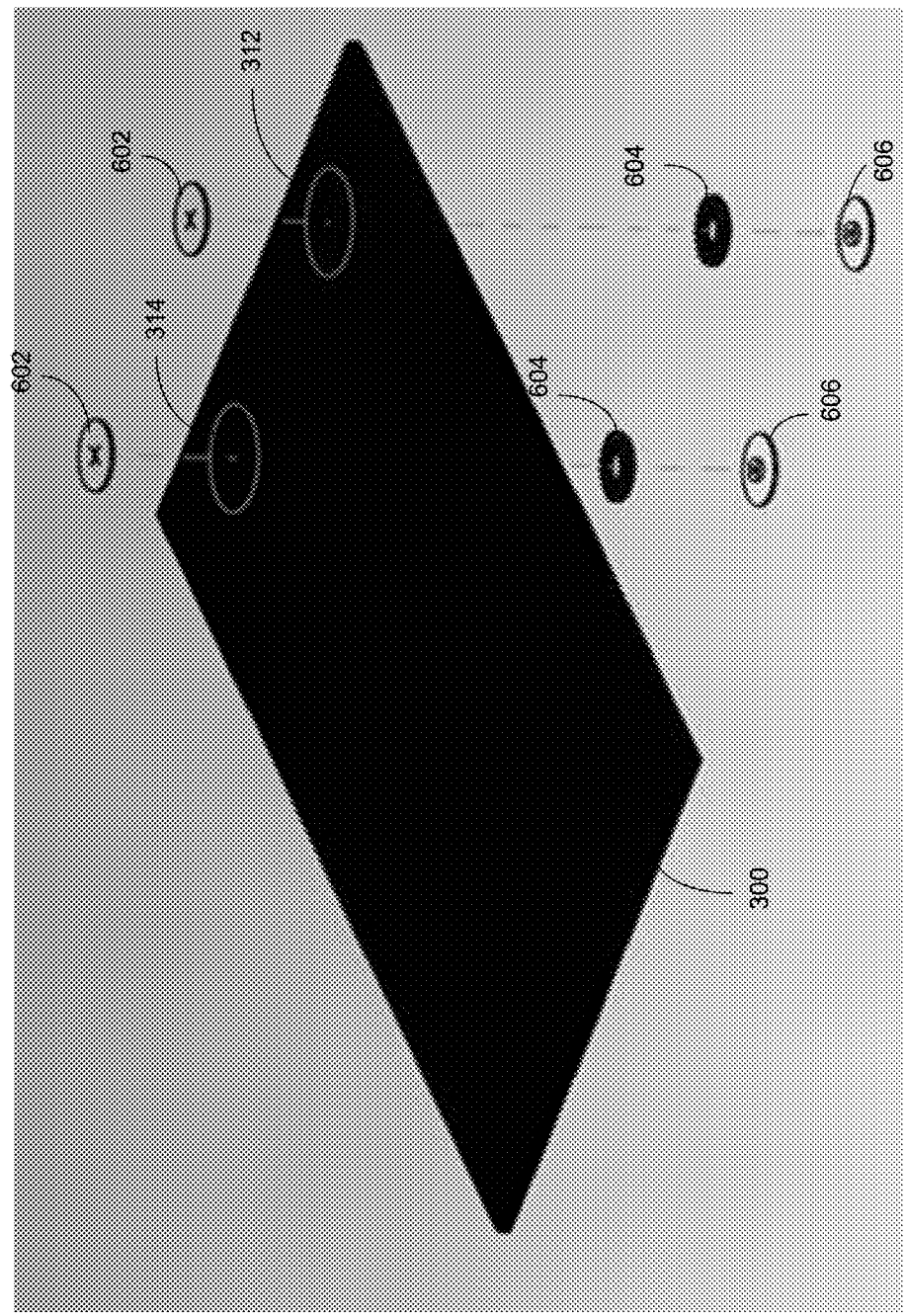
Figure 6F:
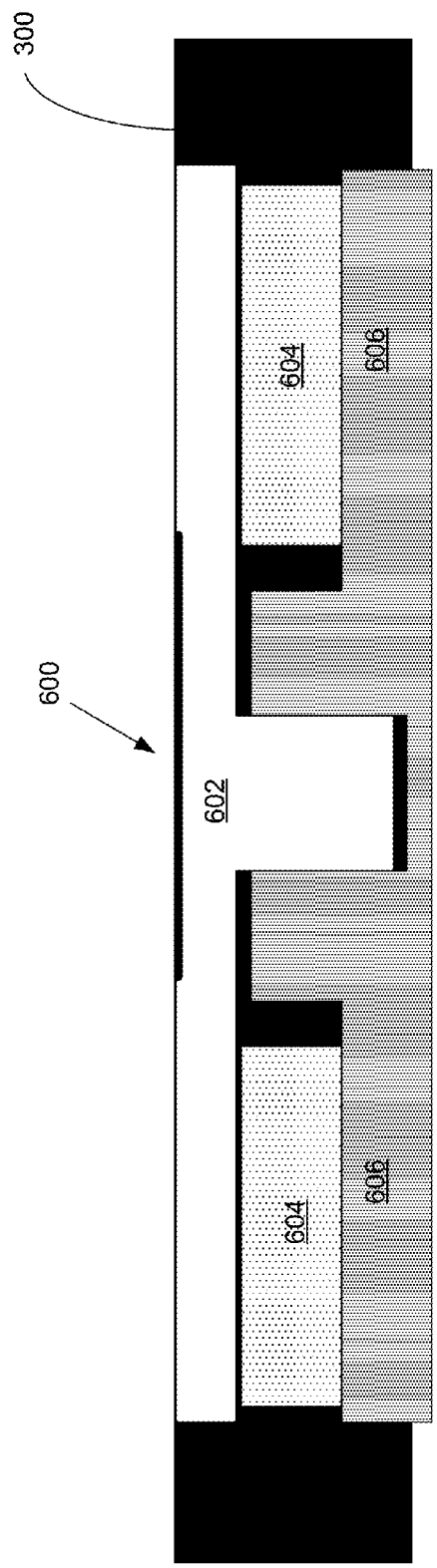

FIGS. 6A-6F illustrate an implementation of the multilayer electro-mechanical connectors 332, 334 that comprises a screw/serrated washer arrangement 600, or another arrangement similar to the screw/serrated washer arrangement 600 as described herein. FIG. 6E is an exploded view of the screw/serrated washer arrangement 600 being inserted into the pathways 312, 314. A screw 602 is inserted through a corresponding pathway 312, 314 thereby piercing and extending through the exposed metal layers 306 and the separator layers 310. The screw 602 engages a serrated washer 604 at an opposite end of the corresponding pathway 312, 314. The screw 602 and serrated washer 604 are tightened relative to one another with a nut 606 to thereby secure the screw/serrated washer arrangement 600. Thus, the screw/serrated washer arrangement 600 electrically couples the exposed metal layers 306 within the corresponding pathway 312, 314, while also mechanically coupling the various layers of the battery arrangement 300. FIG. 6A illustrates a top view of a portion of the battery arrangement 300 with the two screw/serrated washer arrangements 600 inserted into the corresponding pathways 312, 314 of the battery arrangement 300. FIG. 6F schematically illustrates a cross-sectional view of a portion of the battery arrangement 300, as described previously, with a screw/serrated washer arrangement 600 inserted therein.

Various external contacts or contacts can be welded to the multilayer electro-mechanical connectors 332, 334 to allow for connection of the battery arrangement 300, as previously mentioned, to an electronic device (not illustrated). Each external contact includes at least a surface or portion that is exposed with respect to the battery arrangement 300. An example of such an external contact is the flat tab illustrated in FIG. 4C.

FIG. 7A illustrates a battery package 700, similar to battery package 200, that includes a battery arrangement 300 (not illustrated) and includes a packaging material 702 (e.g., the packaging material layer 202 of FIG. 2) and a "pig-nose-like" external contact 704 that is welded to a corresponding electro-mechanical connector 332, 334. The pig-nose external contact 704 generally comprises a metal bump that protrudes beyond the packaging material layer 702 of the battery package 700. In another implementation, the pig-nose contact 704 is recessed with respect to the packaging material layer 702 of the battery package 700.

FIG. 7B is a cross-sectional view of the battery package 700, as seen along the line A' to A" of FIG. 7A. As can be seen in FIG. 7B, in accordance with various implementations, each end of the multilayer electro-mechanical connectors (not illustrated in FIG. 7B) can include a pig-nose external contact 704. Thus, in such an implementation, a top side of each electro-mechanical connector includes two pig-nose external contacts 704a, while a bottom side of each multilayer electro-mechanical connector also includes two pig-nose external contacts 704b. Such an implementation generally allows for better current distribution and power performance.

Figure 8A:
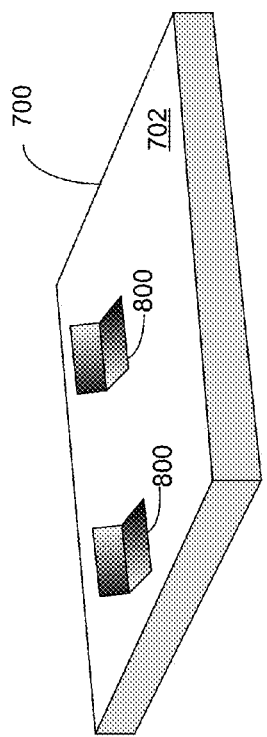
FIGS. 8A-8C schematically illustrate L-shaped external contacts coupled to multilayer electro-mechanical connectors and a protection circuit module coupled to the L-shaped external contacts.
Figure 8C:
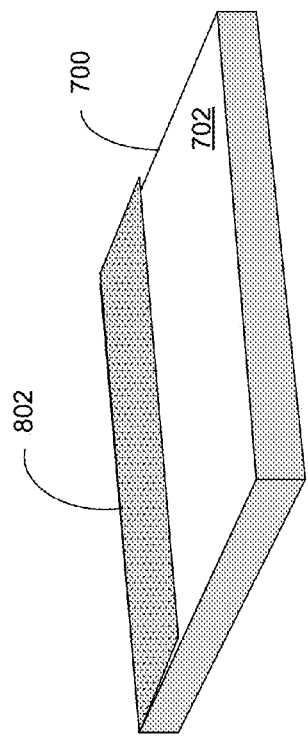
Figure 8B:
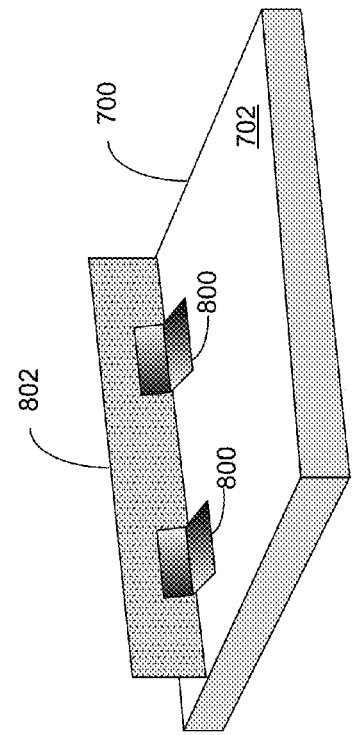

FIG. 8A illustrates L-shaped tabs 800 that are welded to pig-nose contacts 704. The L-shaped contacts 800 can be used to couple the battery package 700, to an electronic device (not illustrated). Alternatively, as can be seen in FIGS. 8B and 8C, a protection circuit module (PCM) 802 is welded to the L-tab contacts 800. The PCM 802 provides protection for the battery and an electronic device that includes the battery from potential overcharging, overdischarging, overvoltage, undervoltage, overcurrent, external short, and overtemperature considerations. FIG. 8C illustrates the PCM 802 folded over so that it is parallel with the packaging material layer 702 of the battery package 700, thereby providing a potential packaging efficiency for the battery package/PCM combination due to the stepped arrangement. The implementation of FIG. 7B where pig-nose contacts are included at both ends of the multilayer electro-mechanical connectors allows for one side of the battery package to include a PCM 802, while pig-nose external contacts 704 on the other side of the battery package 700 can be used to connect the battery package 700 to an electronic device (not illustrated) via the pig-nose external contacts 704. The PCM 802 needs to be connected to the pig-nose external contacts 704 on both sides of the battery package 700. An example of such a connection includes using a flex cable (not illustrated) extending from the PCM 802 to the pig-nose contacts 704 on the side of the battery package 700 opposite to the side of the battery package 700 on which the PCM 802 is attached.

Accordingly, since the multilayer electro-mechanical connectors 332, 334 are configured to pierce and extend through the separator layers, the separator layers do not need to be processed to create recessed regions that correspond to recessed regions of layers of electrode layers. This can reduce manufacturing time and costs.

Figure 9:
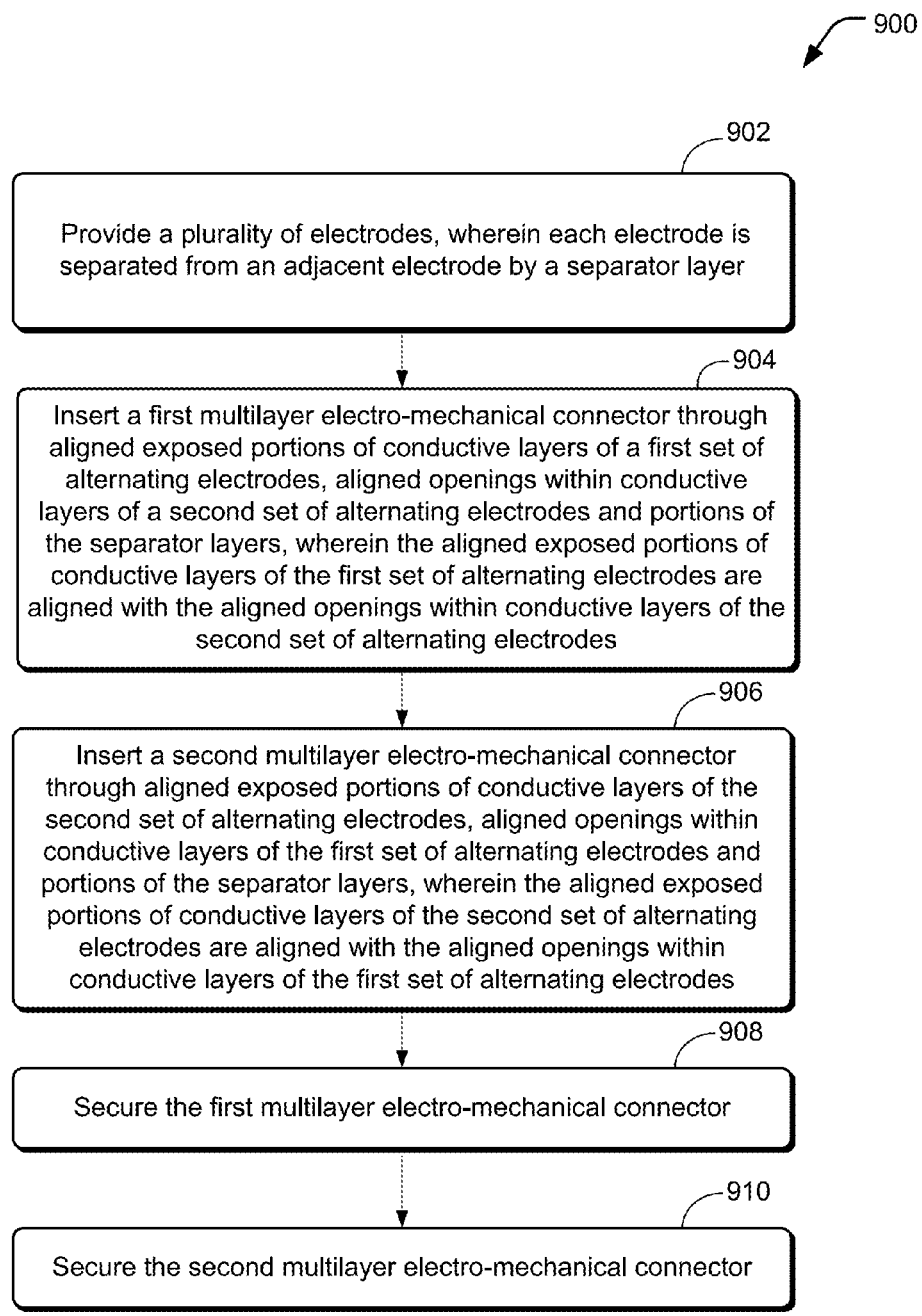
FIG. 9 illustrates a flow diagram of an example process to couple exposed portions of conductive layers and portions of separator layers with multilayer electro-mechanical connectors.

FIG. 9 illustrates a flow diagram of an example process to couple exposed portions of conductive layers and portions of separator layers with multilayer electro-mechanical connectors, e.g., multilayer electro-mechanical connectors 332, 334. At 902, a plurality of electrodes is provided, wherein each electrode is separated from an adjacent electrode by a separator layer. At 904, a first multilayer electro-mechanical connector is inserted through aligned exposed portions of conductive layers of a first set of alternating electrodes, aligned openings within conductive layers of a second set of alternating electrodes and portions of separator layers, wherein the aligned exposed portions of conductive layers of the first set of alternating electrodes are aligned with the aligned openings within conductive layers of the second set of alternating electrodes. At 906, a second multilayer electro-mechanical connector is inserted through aligned exposed portions of conductive layers of the second set of alternating electrodes, aligned openings within conductive layers of the first set of alternating electrodes and portions of the separator layers, wherein the aligned exposed portions of conductive layers of the second set of alternating electrodes are aligned with the aligned openings within conductive layers of the first set of alternating electrodes. At 908, the first multilayer electro-mechanical connector is secured. At 910, the second multilayer electro-mechanical connector is secured. Operations 904 and 906 could occur simultaneously. Additionally, operations 908 and 910 could occur simultaneously.

Figure 10:
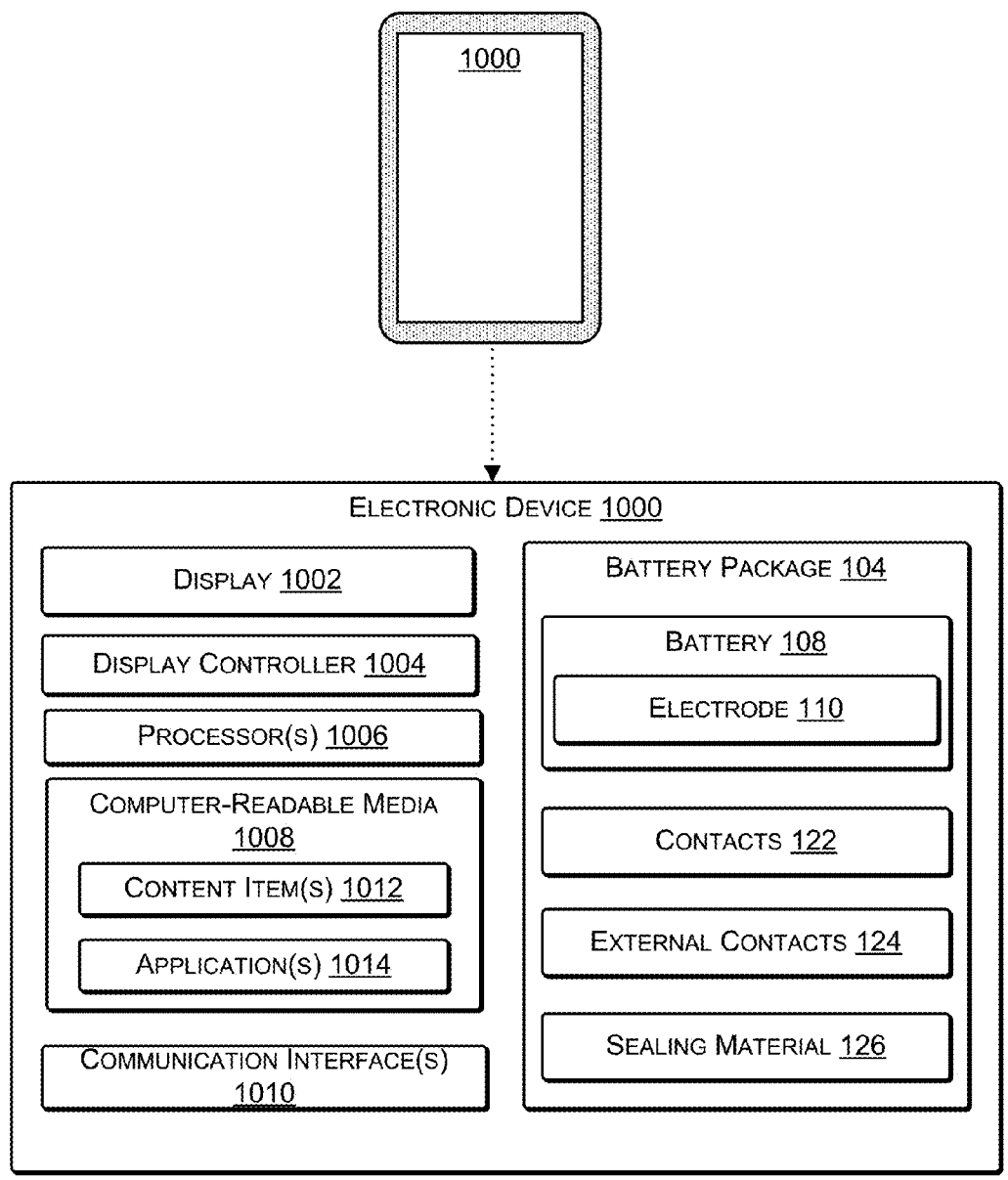
FIG. 10 illustrates an example electronic device having a battery package that includes an electrode with a recessed region, where the recessed region includes an exposed portion of a metal layer that is used to form a contact lead.

FIG. 10 illustrates an example electronic device 1000 having a battery package that includes an electrode with a recessed region, where the recessed region includes an exposed portion of a metal layer that is used to form a contact lead. The electronic device 1000 can include any type of electronic device. For instance, the electronic device 1000 can be a mobile electronic device, such as an electronic book reader, a tablet computing device, a laptop computer, a smart phone or other multifunction communication device, a portable digital assistant, a media player, a wearable computing device, an automotive display, a robotic device, combinations thereof, and the like. Alternatively, the electronic device 1000 may be a non-mobile electronic device, such as a computer display, a desktop computing device, a television, a household appliance, industrial equipment, combinations thereof, and so forth. In addition, while FIG. 10 illustrates several example components of the electronic device 1000, it is to be appreciated that the device 1000 can also include other components, such as an operating system, system busses, input/output components, and the like. Further, in other examples, such as in the case of a television or computer monitor, the electronic device 1000 can include a subset of the components shown.

Regardless of the specific implementation of the electronic device 1000, the electronic device 1000 includes the display 1002 and a corresponding display controller 1004. The display 1002 can include a reflective display, such as an electronic paper display, a reflective liquid crystal display (LCD), or the like. Some examples of the display 1002 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices 1000, the display 1002 can include an active display such as a liquid crystal display, a plasma display, a light emitting diode display, an organic light emitting diode display, and so forth. Accordingly, implementations herein are not limited to any particular display technology.

The electronic device 1000 can include one or more hardware processors 1006 and one or more computer-readable media 1008 and one or more communication interfaces 1010. The communication interfaces 1010 can support both wired and wireless connection to various networks, such as cellular networks, radio, WiFi networks, short range networks (e.g., Bluetooth®), infrared (IR), and so forth.

Depending on the configuration of the electronic device 1000, the computer-readable media 1008 (and other computer-readable media described throughout) is an example of computer storage media and can include volatile and nonvolatile memory. Thus, the computer-readable media 1008 can include, but is not limited to, RAM, ROM, EEPROM, flash memory, or other memory technology, or any other medium that can be used to store computer-readable instructions, programs, applications, media items, and/or data which can be accessed by the electronic device 1000. In some examples, the computer-readable media is a tangible non-transitory computer-readable media.

The computer-readable media 1008 can be used to store any number of functional components that are executable on the processor 1006, as well as content items 1012 and applications 1014. Thus, the computer-readable media 1008 can include an operating system and a storage database to store one or more of the content items 1012, such as eBooks, audio books, songs, videos, still images, and the like. The computer-readable media 1008 of the electronic device 1000 can also store one or more content presentation applications to render some of the content items 1012 on the electronic device 1000 via the display 1002. These content presentation applications may be implemented as various applications 1014 depending upon the content items 1012 being rendered. For instance, a content presentation application can include an electronic book reader application for rendering textual electronic books. In other cases, the applications 1014 can include an audio player for playing audio books or songs, a video player for playing video, and so forth.

The electronic device 1000 can also include one or more power sources, such as the battery package 104. The battery package 104 can include a battery 108 having one or more electrodes, such as the electrode 110. The battery package 104 can also include one or more contacts 122, one or more external contacts 124 and one or more sealing materials 126. The components of the battery package 104 are described in more detail with respect to FIG. 1.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

What is claimed is:

1. A battery package comprising:
   a first electrode and a second electrode, wherein the first electrode and the second electrode are separated by and coupled to a first separator layer;
   a third electrode and a fourth electrode, wherein the third electrode and the fourth electrode are separated by and coupled to a second separator layer, and wherein the third electrode and the second electrode are separated by and coupled to a third separator layer;
   a first electro-mechanical connector; and
   a second electro-mechanical connector,
   wherein each electrode comprises:
      a metal layer including a plurality of openings;
      a first electrode material layer disposed above the metal layer and having (i) a first recessed region that exposes a first portion of the metal layer to form a first exposed portion of the metal layer and (ii) a first opening adjacent to the recessed region aligned with a corresponding opening in the metal layer; and
      a second electrode material layer disposed under the metal layer and having (iii) a second recessed region that exposes a second portion of the first metal layer to form a second exposed portion of the metal layer and (iv) a second opening adjacent to the second recessed region aligned with a corresponding opening in the metal layer,
   wherein the first and the second exposed portions of the metal layer of the first electrode and the third electrode are aligned with each other and are aligned with the first and the second openings of the second electrode and the first and the second openings of the fourth electrode,
   wherein the first and the second exposed portions of the metal layers of the second electrode and the fourth electrode are aligned with each other and are aligned with the first and the second openings of the first electrode and the first and the second openings of the third electrode,
   wherein the first electro-mechanical connector electrically couples the metal layers of the first and the third electrodes and mechanically couples the first, the second, the third and the fourth electrodes, and wherein the second electro-mechanical connector electrically couples the metal layers of the second and the fourth electrodes and mechanically couples the first, the second, the third and the fourth electrodes.

2. The battery package of claim 1, further comprising:

a first external contact, wherein a portion of the first external contact is exposed with respect to the battery package and is coupled to the first electro-mechanical connector; and a second external contact, wherein a portion of the second external contact is exposed with respect to the battery package and is coupled to the second electro-mechanical connector, wherein the first and the second external contacts are configured to couple the battery package to an electronic device.

3. The battery package of claim 2, wherein the first and second external contacts each comprise one of a flat tab contact, a pig-nose contact, or an L-shaped tab contact.

4. The battery package of claim 2, wherein the first and second external contacts each comprise an L-shaped tab contact and the battery package further comprises a protection circuit module located on the batter package and welded to each L-shaped tab contact, wherein the protection circuit module is configured to provide protection for the battery package from potential overcharging, overdischarging, overvoltage, undervoltage, overcurrent, external short, and overtemperature considerations.

5. An electronic device comprising:

a battery package comprising:

first, second, third and fourth electrodes, each of the first, second, third and fourth electrodes including a conductive layer and each electrode of the first, second, third and fourth electrodes being separated from an adjacent electrode by a separator layer;

a first connector;

a second connector;

a first contact coupled to the first connector; and a second contact coupled to the second connector, wherein the first connector extends through aligned exposed portions of conductive layers of the first and third electrodes, aligned openings within conductive layers of the second and fourth electrodes and portions of the separator layers, wherein the aligned exposed portions of conductive layers of the first and third electrodes are aligned with the aligned openings within the conductive layers of the second and fourth electrodes, wherein the second connector extends through aligned exposed portions of conductive layers of the second and fourth electrodes, aligned openings within conductive layers of the first and third electrodes and portions of the separator layers, wherein the aligned exposed portions of conductive layers of the second and fourth electrodes are aligned with the aligned openings within conductive layers of the first and third electrodes.

6. The electronic device of claim 5, wherein the first and third electrodes are cathodes and the second and fourth electrodes are anodes.

7. The electronic device of claim 5, wherein the first and second connectors each comprise a staple.

8. The electronic device of claim 5, wherein the first and second connectors each comprise a screw/serrated washer combination.

9. The electronic device of claim 5, wherein the first and the second contacts each comprise one of a flat tab contact, a pig-nose contact, or an L-shaped tab contact.

10. The electronic device of claim 5, wherein the first and second contacts each comprise an L-shaped tab contact and the battery package further comprises a protection circuit module located on the battery package and welded to each L-shaped tab contact, wherein the protection circuit module is configured to provide protection for the battery and the electronic device from potential overcharging, overdischarging, overvoltage, undervoltage, overcurrent, external short, and overtemperature considerations.

11. The electronic device of claim 5, further comprising:

a third contact coupled to a bottom of the first multilayer electro-mechanical connector; and a fourth contact coupled to a bottom of the second multilayer electro-mechanical connector, wherein the first, second, third and fourth contacts each comprise a pig-nose contact.

12. The electronic device of claim 11, further comprising either (i) a first L-shaped tab contact welded to the first contact and a second L-shaped tab contact welded to the second contact or (ii) a first L-shaped tab contact welded to the third contact and a second L-shaped tab contact welded to the fourth contact.

13. The electronic device of claim 12, wherein the battery package further comprises a protection circuit module welded to the first and second L-shaped tab contacts, and wherein the protection circuit module is configured to provide protection for the battery and the electronic device from potential overcharging, overdischarging, overvoltage, undervoltage, overcurrent, external short, and overtemperature considerations.

14. The electronic device of claim 5, wherein the electronic device comprises one of an electronic book reader, a tablet computing device, a laptop computer, a smart phone, a portable digital assistant, a media player, a wearable computing device, an automotive display or a robotic device.

15. A battery comprising:

a plurality of electrodes;

first and second connectors;

a first contact coupled to the first connector; and a second contact coupled to the second connector, wherein the first connector extends through aligned exposed portions of conductive layers of a first set of electrodes and aligned openings within conductive layers of a second set of electrodes, wherein the second connector extends through aligned exposed portions of conductive layers of the second set of electrodes and aligned openings within conductive layers of the first set of electrodes, and wherein electrodes of the first set of electrodes alternate with electrodes of the second set of electrodes.

16. The battery of claim 15, wherein the first and the second connectors each comprise a staple.

17. The battery of claim 15, wherein the first and the second connectors each comprise a screw/serrated washer combination.

18. The battery of claim 15, wherein the first and the second contacts each comprise one of a flat tab contact, a pig-nose contact, or an L-shaped tab contact.

19. The battery of claim 15, wherein the first and second contacts each comprise an L-shaped tab contact and the battery further comprises a protection circuit module located on the battery and welded to each L-shaped tab contact, and wherein the protection circuit module is configured to provide protection for the battery from potential overcharging, overdischarging, overvoltage, undervoltage, overcurrent, external short, and overtemperature considerations.

20. The battery of claim 15, wherein the battery is included within an electronic device that comprises one of an electronic book reader, a tablet computing device, a laptop computer, a smart phone, a portable digital assistant, a media player, a wearable computing device, an automotive display or a robotic device.

* * * * *